(12) United States Patent
Baulier et al.

(10) Patent No.: US 7,685,699 B2
(45) Date of Patent: Mar. 30, 2010

(54) DOCKING APPARATUS

(75) Inventors: Dominique Baulier, St. Clair Beach (CA); Mihaela Petrescu, Windsor (CA); Thomas Stein, Windsor (CA); Justyna Klapacz, Windsor (CA)

(73) Assignee: Variant Corporation, Windsor, Ontario (CA)

( * ) Notice: Subject to any disclaimer, the term of this patent is extended or adjusted under 35 U.S.C. 154(b) by 1226 days.

(21) Appl. No.: 11/230,715

(22) Filed: Sep. 20, 2005

(65) Prior Publication Data

US 2006/0013646 A1    Jan. 19, 2006

Related U.S. Application Data

(63) Continuation-in-part of application No. 10/668,525, filed on Sep. 23, 2003, now Pat. No. 7,100,271.

(51) Int. Cl.
 *B23P 19/00* (2006.01)
(52) U.S. Cl. .............. 29/700; 29/407.09; 29/407.1; 29/465; 29/466; 29/468
(58) Field of Classification Search ............ 29/465, 29/466, 468, 559, 700, 711, 783, 787, 791, 29/795, 281.1; 483/22, 27; 901/30, 41; 269/71, 55, 56, 909
See application file for complete search history.

(56) References Cited

U.S. PATENT DOCUMENTS

| | | | |
|---|---|---|---|
| 4,494,687 A | 1/1985 | Rossi | 228/47 |
| 4,667,866 A | 5/1987 | Tobita et al. | 228/4.1 |
| 4,946,089 A | 8/1990 | Baulier et al. | 228/45 |
| 5,011,068 A | 4/1991 | Stoutenburg et al. | 339/4.1 |
| 5,163,726 A * | 11/1992 | Boos et al. | 294/81.1 |
| 5,232,513 A | 8/1993 | Suratt et al. | 134/21 |
| 5,251,739 A | 10/1993 | Tolocko | |
| 5,397,047 A | 3/1995 | Zampini | 228/6.1 |
| 5,419,352 A | 5/1995 | Johnson | 134/102.1 |
| 5,632,588 A | 5/1997 | Crorey et al. | |

(Continued)

FOREIGN PATENT DOCUMENTS

DE          4418755 A1     11/1995

(Continued)

*Primary Examiner*—Jermie E Cozart
(74) *Attorney, Agent, or Firm*—Gifford, Krass, Sprinkle, Anderson & Citkowski, P.C.

(57) ABSTRACT

A vehicle framing system for framing an automotive vehicle body from a plurality of separate body components wherein the body components each include a reference surface. The system includes an assembly station having spaced-apart frame members positioned so that, when a vehicle carrier supporting the vehicle body components is positioned at the assembly station, the frame members extend along opposite sides of the vehicle carrier. At least two docking stations are secured to each frame member at predetermined locations. A robot mounts its associated tool arm with a docking station. At least one set of reference block and framing clamp is secured to each tool arm and these framing clamps maintain the reference surfaces of the vehicle body components against the reference blocks to hold the vehicle components at a predetermined position relative to each other. After each robot positions each associated tool arm with the docking station, the robot disengages from the tool arm and then welds the body components together by a welding gun carried by the robots.

13 Claims, 20 Drawing Sheets

U.S. PATENT DOCUMENTS

| | | | |
|---|---|---|---|
| 5,902,496 A | 5/1999 | Alborante | 219/86.24 |
| 6,008,471 A | 12/1999 | Alborante | 219/158 |
| 6,065,200 A | 5/2000 | Negre | 29/430 |
| 6,074,329 A | 6/2000 | Hirano et al. | |
| 6,138,889 A | 10/2000 | Campani et al. | 228/4.1 |
| 6,364,817 B1 | 4/2002 | McNamara et al. | |
| 6,378,186 B1 | 4/2002 | Angel | 29/281.1 |
| 6,389,698 B1 | 5/2002 | Malatier | 29/897.2 |
| 6,438,842 B1 | 8/2002 | Raami | 29/897.2 |
| 6,493,930 B1 | 12/2002 | Raami | 29/783 |
| 2003/0037432 A1 | 2/2003 | McNamara | 29/771 |

FOREIGN PATENT DOCUMENTS

| | | |
|---|---|---|
| EP | 0 147 530 | 9/1984 |
| EP | 0734941 A1 | 10/1996 |
| EP | 1 302 391 | 4/2003 |
| FR | 2 627 116 | 8/1990 |
| FR | 2 833 877 | 6/2003 |
| WO | 95/32886 | 12/1995 |
| WO | 01/26953 | 4/2001 |
| WO | 02/092278 | 11/2002 |

\* cited by examiner

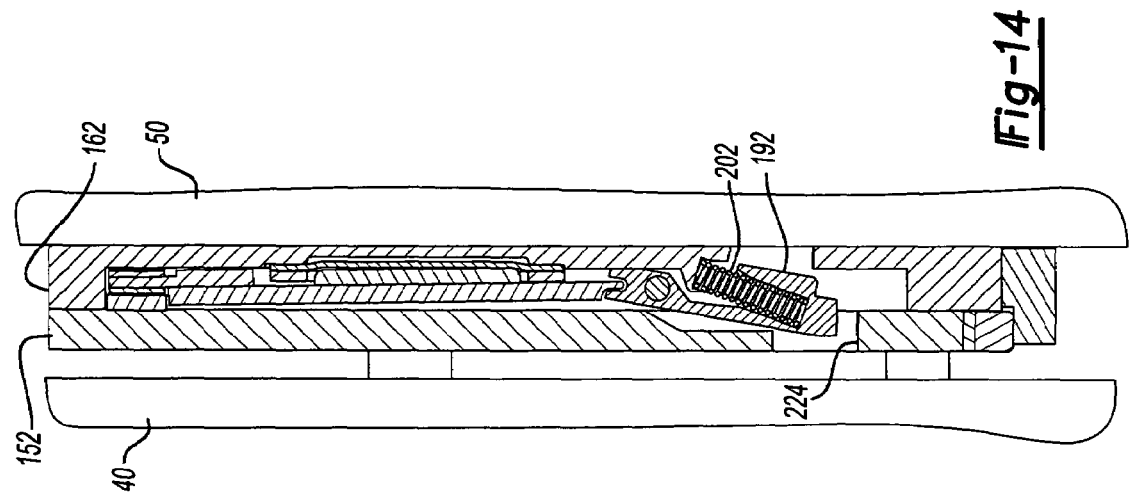
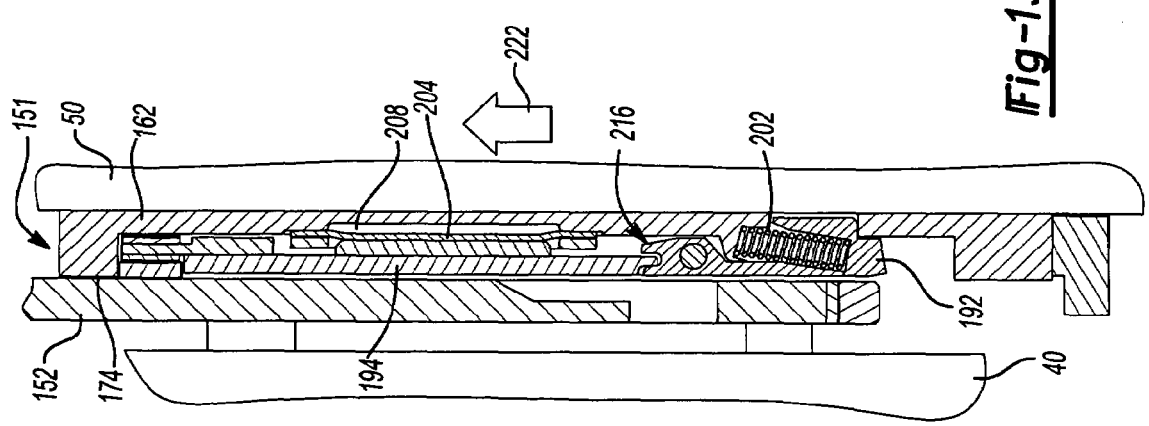
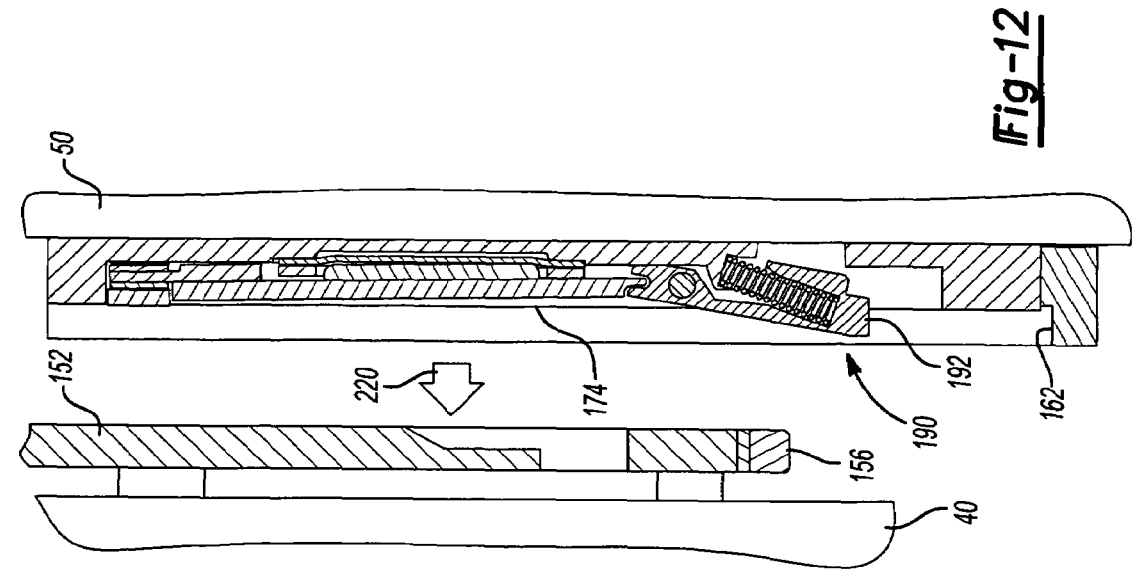

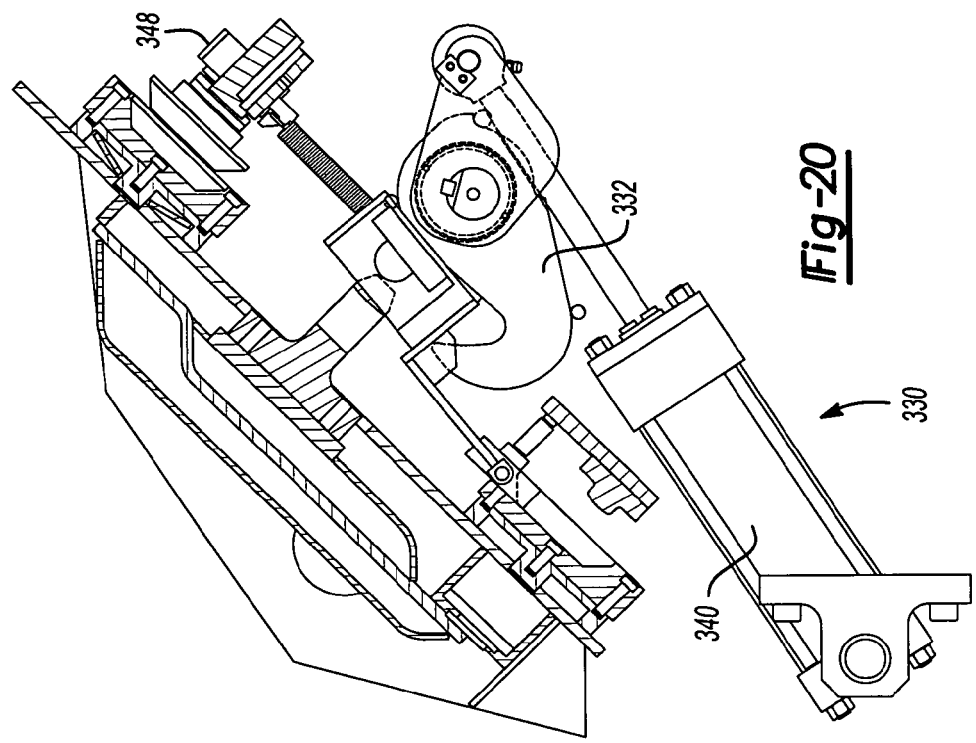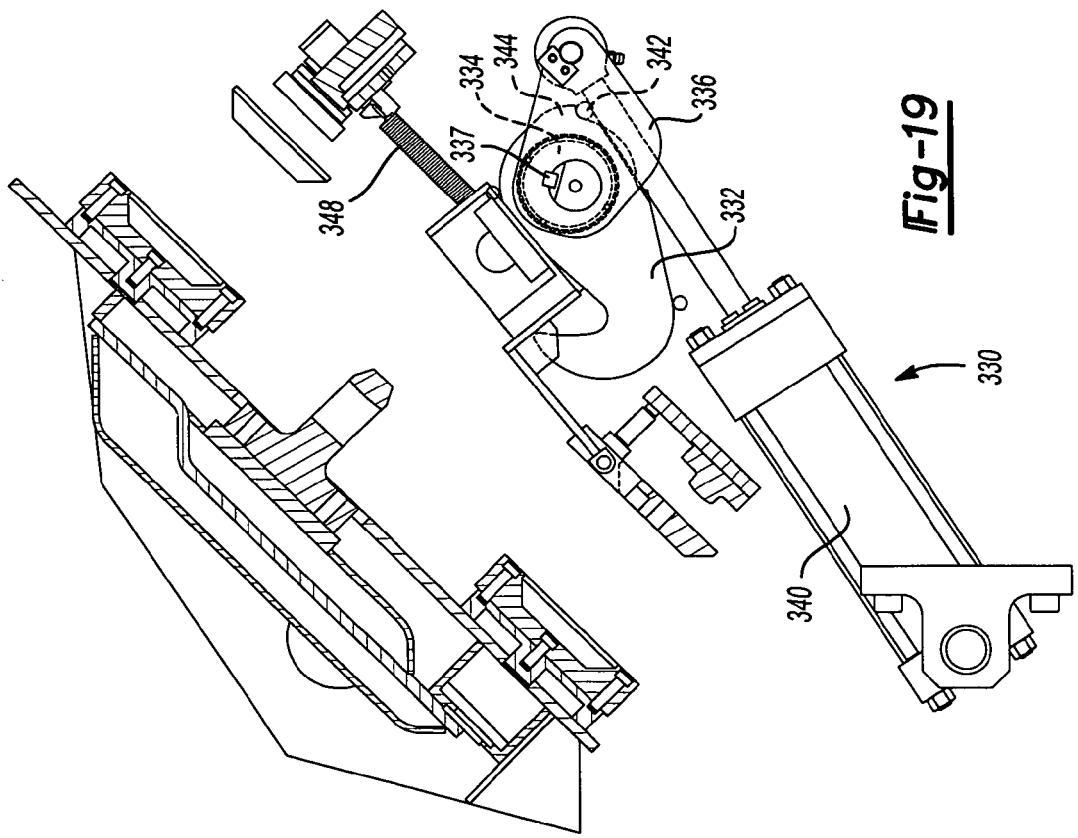

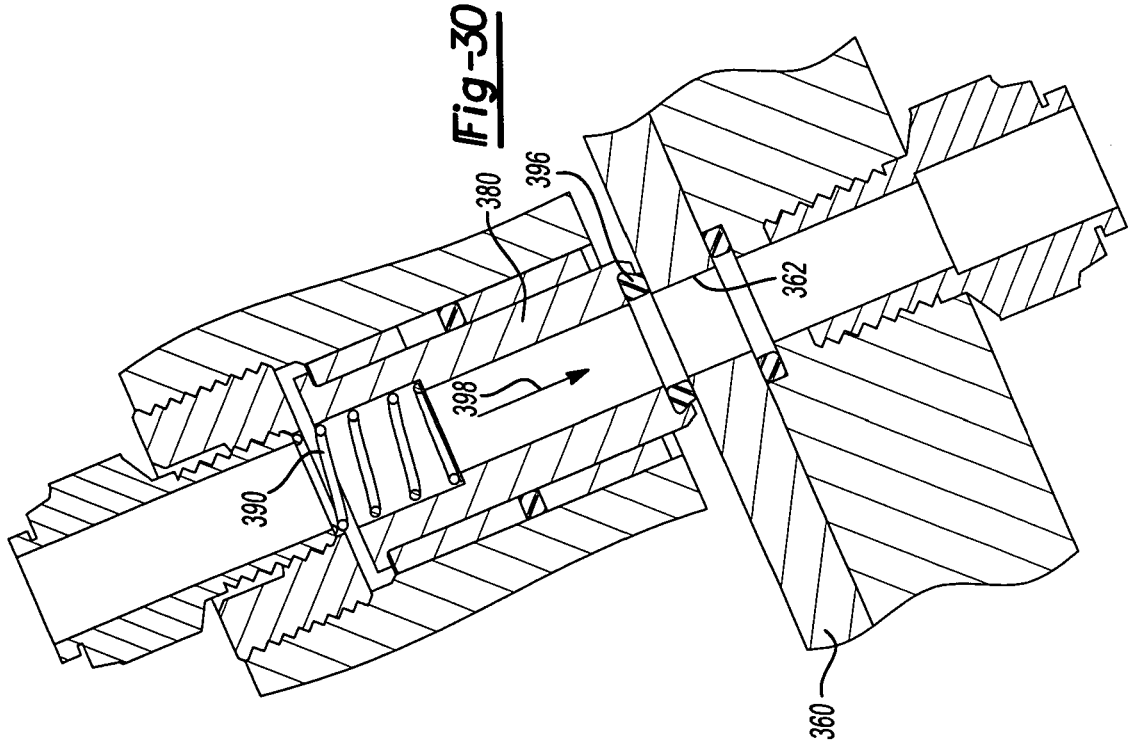
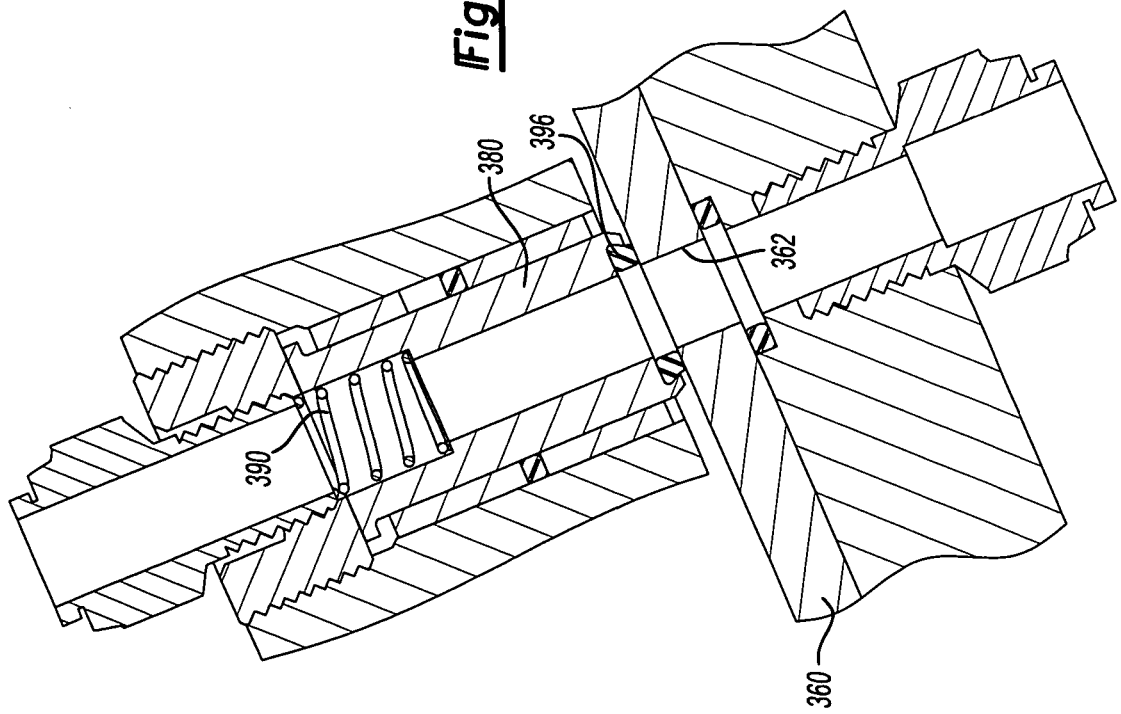

DOCKING APPARATUS

CROSS-REFERENCE TO RELATED APPLICATIONS

This application is a continuation-in-part of U.S. patent application Ser. No. 10/668,525 filed Sep. 23, 2003, now U.S. Pat. No. 7,100,271 B2.

BACKGROUND OF THE INVENTION

I. Field of the Invention

The present invention relates to an automotive framing system, or any other geometry station, for accurately positioning vehicle body components relative to each other prior to securing the vehicle body components together.

II. Description of the Prior Art

In the manufacture of automotive vehicles, a conveyor system typically transports a body preassembly sequentially along a conveyor line. Such body preassemblies supported by a vehicle carrier comprise various body components, such as an underbody, front structure, body sides, headers, etc., which are loosely attached to each other in their approximate final assembly position relative to each other.

In order to fixedly secure the body components together, it is imperative that the body components be precisely positioned relative to each other to freeze their geometry by "tack welds" performed in this framing station, prior to a "respot" of the whole body in order to provide its final strength. To accomplish such precision positioning of the body components, there have been previously known automotive framing systems.

In one prior art automotive framing system, a gantry is positioned above the assembly station at a midpoint of the conveyor line. The gantry includes swing arms which are movable between a raised and a lowered position. In their raised position, the swing arms are positioned away from the body preassembly which enables the next preassembly to be moved by the conveyor system into the assembly station. Conversely, in their engaged position, the arms swing downwardly approaching "damp units" supporting reference blocks and clamps to engage predetermined reference surfaces or location points of the various vehicle body components, and clamp the body components together at a predetermined position relative to each other. With the body components clamped together, robotic welders or the like extend through openings in the reference frame and are used to fixedly secure the body components together by "tack welds".

In still a further type of previously known automotive framing system, a reference frame is positioned around the body preassembly when the preassembly is positioned at the assembly station. In this type of previously known automotive framing system, pivoting or sliding units connected to the reference frame and supporting reference blocks and clamps extend into the interior of the automotive vehicle body components to engage the reference surfaces of the body components, and lock the body components together at a predetermined position relative to each other prior to welding.

In still a further type of previously known automotive framing system, a side gate is positioned along each side of the assembly station. These side gates are movable between a retracted position, in which the gates are positioned laterally outside the assembly station to permit the body preassembly to be moved into the assembly station, and an assembly position in which the gates are positioned along each outer side of the body preassembly. Pivoting or siding units mounted onto the gates and supporting clamping assemblies then extend into the vehicle body components to secure the body components in the desired predetermined position relative to each other. Thereafter, robotic welders extend through openings in the gate, into the vehicle and "tack weld" the vehicle body components together.

All of these previously known automotive framing systems, however, suffer from a number of common disadvantages. First, the wide area covered by the same tool structure, i.e. the gate or swing arm, does not enable a common approaching trajectory for the tool structure in which all the reference blocks and clamp units will remain stationary on the tool structure, and the clamps of simple design. Further, to remain quasi-standard, the gates, frames, or swing arms supporting the pivoting or sliding units holding the reference blocks and clamping units will stay positioned remotely around the exterior of the body preassembly. Since the clamping surfaces on the body components are frequently contained within the interior of the body preassembly, these previously known framing systems necessarily required complex, articulated clamping assemblies which must extend into the interior of the body preassembly in order to clamp the body components at their desired position relative to each other. Such clamping assemblies are oftentimes necessarily articulated relative to their gate or reference frame. As such, these clamping assemblies are both expensive to manufacture and subject to wear after prolonged use. Such wear adversely affects the accuracy of the overall framing system.

A still further disadvantage of these previously known framing systems is that, after the body preassembly has been moved into the assembly station and clamped at the desired position relative to each other, it is necessary for robotic welders to then extend through openings in either the gate or the reference frame in order to weld the body components together. Due to interference between the robotic welders and either the gate or reference frame, the use of complex and time-consuming robot trajectories, and thus expensive robotic engineering study, has been required.

A still further disadvantage of these previously known framing systems is that it is necessary to use a different reference frame or a different gate even for slightly different vehicle body styles. Since multiple body styles are oftentimes assembled together at a single assembly station, it has been previously necessary to move either different reference frames or different gates to the assembly station in order to accommodate the different vehicle body styles. Since these previously known reference frames and gates are massive in construction and require a long design and fabrication time, they are expensive and may delay the time to put a new vehicle on the market. Furthermore, these systems require a large footprint on the shop floor to store the unused set of tools.

Recently, a new generation of framing system has been developed to take advantage of the low cost, mass-produced robots. All these framers try to reproduce the exact same tool change movement previously achieved with a dedicated piece of machinery, but by using a dedicated high load capacity robot. The tooling used corresponds to the previous gates or frames, but is more simply built with lighter structure, material and components. There is, of course, an initial saving achieved on the tool handing system, but because the tooling remains large and difficult to handle, the full agility of the robot cannot be exploited. Furthermore, the tooling still requires a lot of pivoting or sliding units to bring some movable reference blocks into contact with their working surface, thus increasing the complexity of the tooling, its weight, compliance, cost, reliability and cycle time.

SUMMARY OF THE PRESENT INVENTION

The present invention provides an automotive framing system for a vehicle body which overcomes all of the above-mentioned disadvantages of the previously known devices by splitting the traditional large tool frame in a set of elementary tool arms with which the robot can develop its full agility to set in position.

In brief, the vehicle framing system of the present invention comprises an assembly station having spaced-apart frame members. A vehicle carrier which supports the vehicle body components in a preassembled condition is then moved into the assembly station by a conventional conveyor.

Depending on the body carrier type, i.e. a skid or a geometry pallet, these spaced-apart frame members can be vertically movable but preferably stationary.

At least two docking stations are secured to each frame member at predetermined positions along the frame member. One or more tool arm is associated with each docking station and each tool arm includes at least one set of reference blocks or locating pins and its clamp designed to engage a reference surface on one of the vehicle body components to secure the vehicle body components at predetermined positions relative to each other.

A robot is associated with each tool arm and will preferably carry both its welding gun and its associated tool arm to avoid lost time in switching one for the other. The robot moves each tool arm between an assembly position and a vehicle loading position where other tool arms dedicated to other vehicle types are stored.

During the body loading operation, the proper tool arm is selected from a tool arm storage support 27 (FIG. 1) and engaged by the robot. As soon as the new loose-mounted body preassembly is positioned in the framing station, each robot manipulates its tool arm into the body frame thus bringing the stationary reference block into contact with the corresponding location surface. Once in the exact assembly position, each tool arm abuts against its associated docking station so that each tool arm is positioned at the assembly station at a predetermined position relative to the frame members at the assembly station. Then a tool arm clamp mounted on each docking station clamps the tool arm to its associated docking position at a predetermined position and a media quick coupling provides pressurized air and electric connections to energize the clamps or any other air cylinder or proximity switches.

Once the tool arms are secured to their associated docking stations, each robot disengages from its associated tool arm, while at the same time all the clamping sequence is achieved. Thereafter, a welder carried by at least one of the robots extends into the body vehicle preassembly in order to fixedly secure the body components together at their predetermined position relative to each other thus completing the body assembly.

After the body components are welded together, the clamps are released and each robot reengages with its associated tool arm. Thereafter, the tool arm clamps disengage thus releasing the tool arms from their associated docking stations. The robots then move the tool arms laterally outwardly to their vehicle loading position, and depending on the next vehicle to frame or a specific process, it may either keep the same tool arm or drop it to "respot" the current vehicle, or take a new tool arm matching the new vehicle type. Thereafter, the now assembled vehicle body assembly is moved by the conveyor out of the assembly station while a new vehicle carrier supporting a new body preassembly is moved into the assembly station and the above process is repeated.

A primary advantage of the framing system of the present invention is that the robots are able to manipulate the tool arms so that a portion of one or more of the tool arms extend into the body preassembly and closely adjacent the body component reference surfaces. As such, relatively inexpensive clamping assemblies carried by each tool arm are employed to not only rapidly, but also accurately, position the vehicle body components together in preparation for final assembly. Since relatively simple clamping assemblies are used to position the vehicle body components, inaccuracies caused by wear and/or design of the previously known articulated clamps are avoided and welding robot accessibility is maximized.

A still further advantage of the automotive framing system of the present invention is that different tool arms may be easily engaged and manipulated by the robots in order to accommodate different body styles. Furthermore, in case of robot interference or crash or other tool arm malfunction, only a simple fraction of the tooling will need to be fixed and geometrically recalibrated.

Since all of the robots installed are fully utilized in both the handling and welding processes, the extra cost and additional footprint and volume requirement next to the body to frame of the previous systems which used dedicated robots for handling is avoided.

The present invention allows up to four or five medium capacity welding robots per side for a pure floor-mounted configuration and, if necessary, four to six additional robots mounted on a balcony, reducing the overall cycle time for a given number of tack-welds to be performed.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIGS. 12-17 are all diagrammatic sectional views illustrating the steps of attachment and detachment of the coupling assembly;

FIGS. 19-22 are all fragmentary side sectional views illustrating the steps in the attachment of the tool arm to the docking station;

FIGS. 27-30 are all side fragmentary sectional longitudinal views illustrating the fluid connection of one fluid connector between the tool arm and the docking station;

DETAILED DESCRIPTION OF A PREFERRED EMBODIMENT OF THE PRESENT INVENTION

Figure 1:
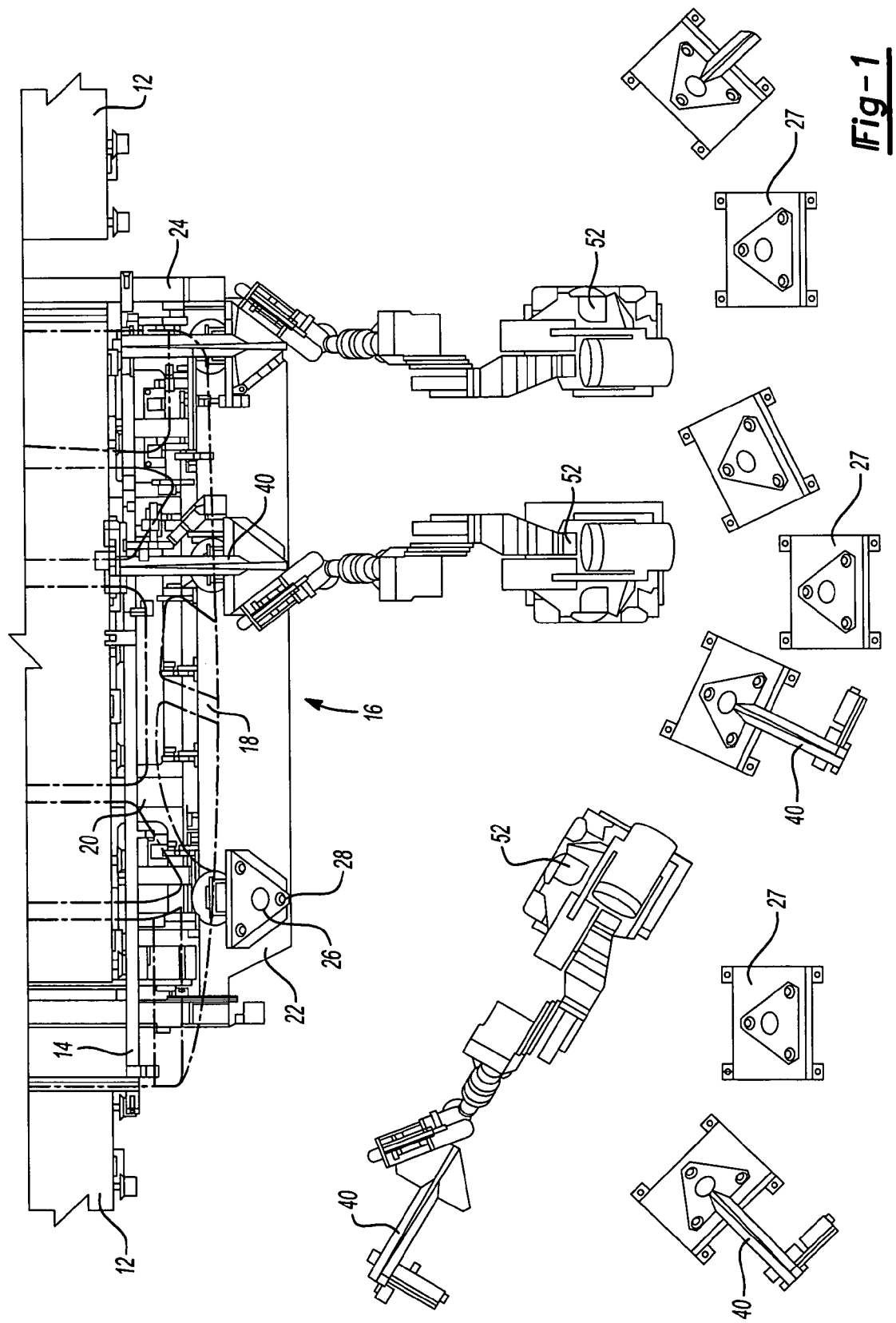
FIG. 1 is a top plan view illustrating a preferred embodiment of the present invention.

With reference first to FIG. 1, a preferred embodiment of the automotive framing system 10 of the present invention is shown for use with a manufacturing line for automotive vehicles. As used in this patent, the term "framing system" encompasses not only the vehicle frame of an automotive vehicle, but also any application where accurate positioning of two or more body components is desired. For example, such a framing system would also include fender setting, roof setting, door setting, as well as other vehicle body components than the vehicle frame. An elongated conveyor 12, illustrated only diagrammatically, sequentially conveys automotive body vehicle carriers 14 to an assembly station 16. Any conventional type of conveyor 12 may be utilized to convey the vehicle carrier 14 to the assembly station 16.

Figure 2:
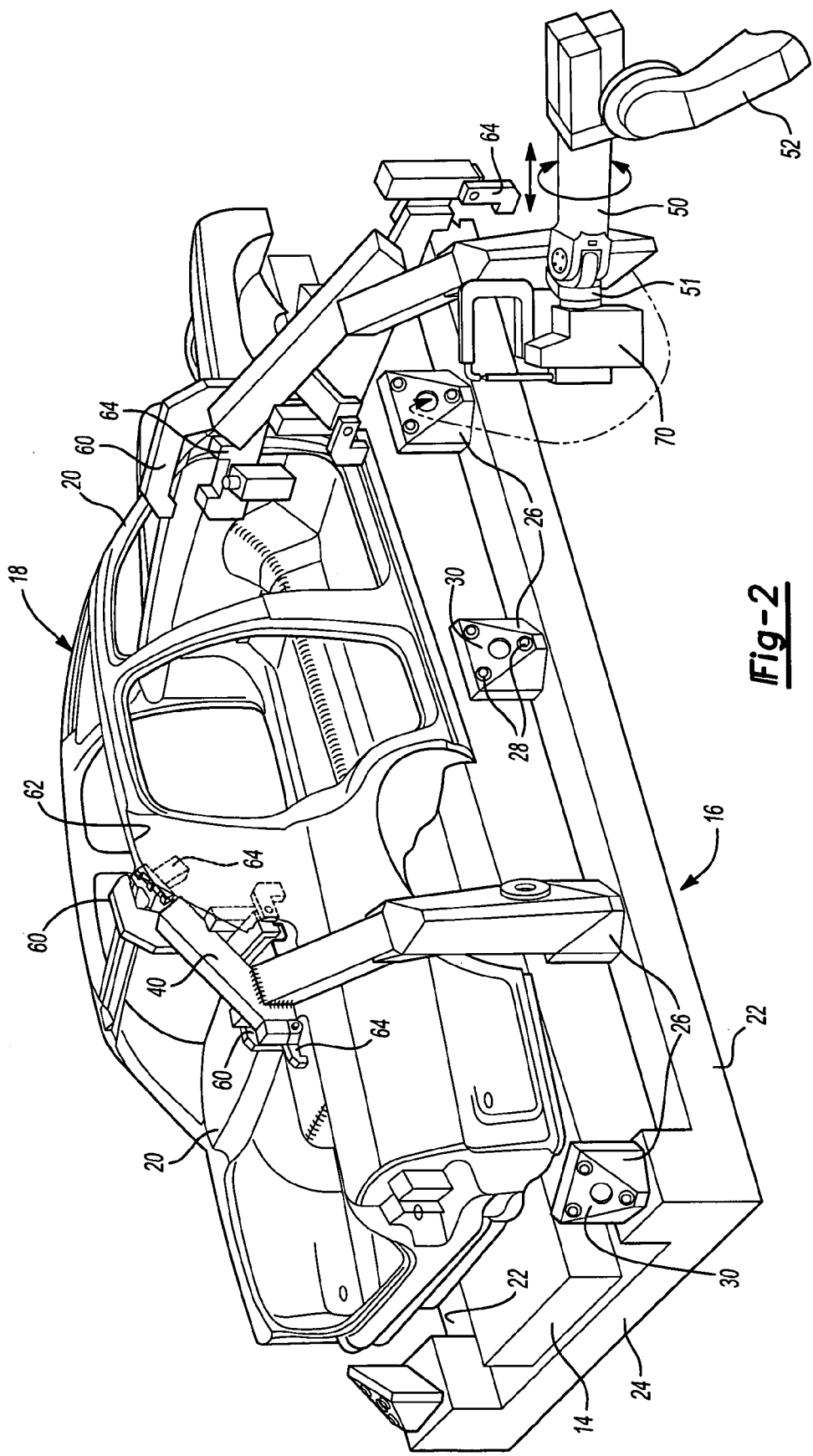
FIG. 2 is an elevational view illustrating a preferred embodiment of the present invention and with parts removed for clarity.

As best shown in FIG. 2, each vehicle body carrier 14 supports a body preassembly 18 comprising a plurality of body vehicle components 20. The body vehicle components 20 are only loosely fastened together in their approximate final assembly position by restraining tags, also known as toy tabs, or other conventional means (not shown). Furthermore, the vehicle body carrier 14 is conventionally known as a skid or a geometry pallet in the automotive industry.

With reference now particularly to FIG. 2, the assembly station 16 is shown in greater detail and comprises a pair of spaced-apart frame members 22 which extend along opposite sides of the vehicle body carrier 14 and thus along opposite sides of the body preassembly 18. Preferably, crossbeams 24 extend laterally between the frame members 22 to lock the frame members 22 together in a predetermined fixed position.

Still referring to FIG. 2, at least two and preferably three or four docking stations 26 are provided along each side of the assembly station 16. Each docking station 26 is fixedly secured to the frame members 22 so that the position of each docking station 26 is fixed relative to the frame member 22 and thus relative to the assembly station 16.

Figure 3:
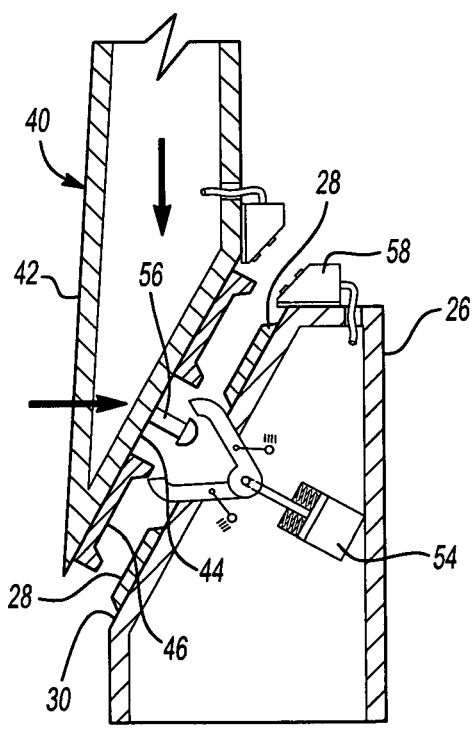
FIG. 3 is a sectional fragmentary view illustrating the docking of a tool arm with its associated docking station.

As best shown in FIGS. 2 and 3, each docking station 26 includes at least one and preferably three locator pins 28 so that each locator pin 28 is positioned at an apex of a triangular surface 30, preferably oriented at 45 degrees from the horizontal on the docking station 26. As best shown in FIG. 3, each locator pin 28 is preferably frusto-conical in shape with a preferred conicity angle of 90 degrees, and the pins 28 are fixedly secured to their associated docking stations 26.

Each docking station 26 also includes a media quick coupling 58 (FIGS. 3 and 5) which provides pressurized air and electric signals to the associated clamp arm in order to energize the framing clamps 64 as well as other air cylinder or proximity switches.

Figure 4:
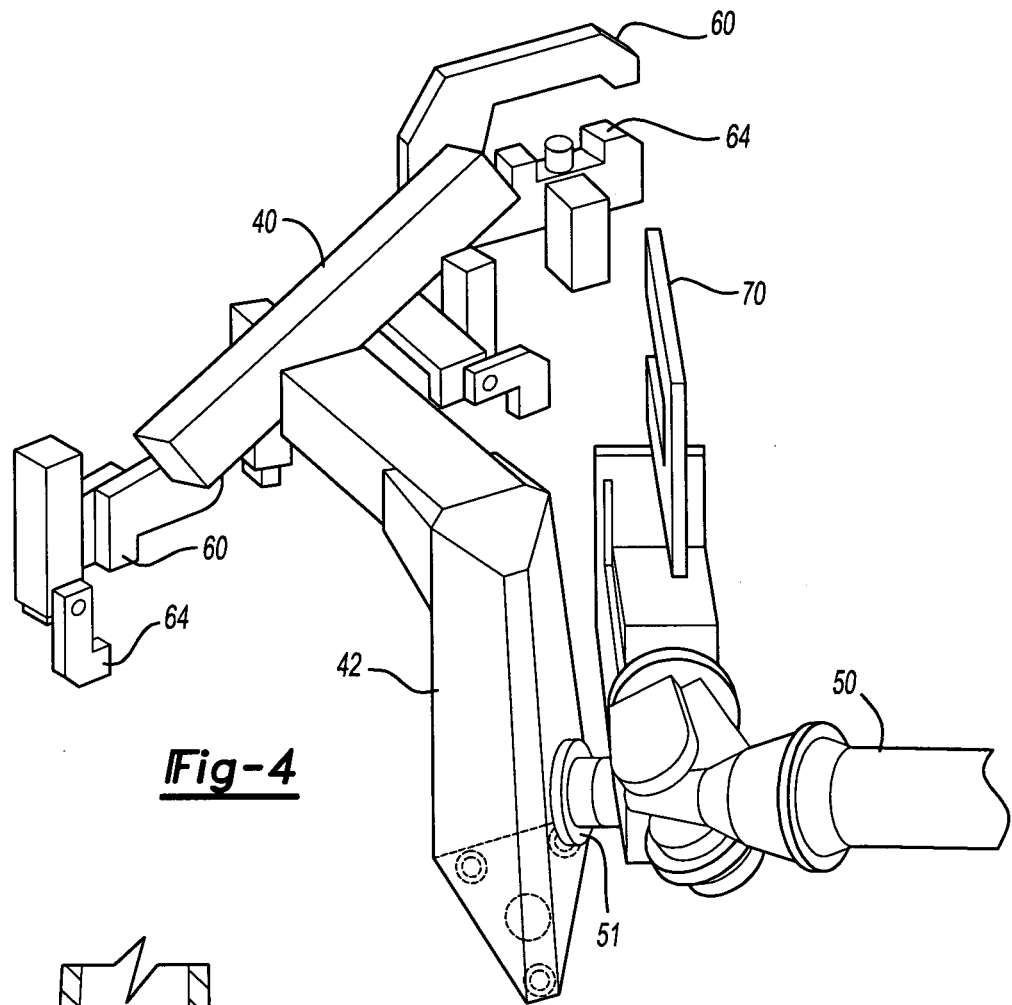
FIG. 4 is a fragmentary elevational view illustrating one tool arm and a portion of its associated robot.

With reference now particularly to FIGS. 2 and 4, the framing system further includes a plurality of tool arms 40 which, as will be shortly described, selectively clamp the vehicle body components 20 together at a predetermined position relative to each other prior to final assembly. It will be understood, of course, that the precise configuration of each tool arm 40 will vary depending upon the type of vehicle assembled at the assembly station 16. Consequently, the tool arms 40 illustrated in the drawing are for illustration purposes only.

With reference then to FIGS. 2-4, the tool arm 40 includes a main body 42 which is constructed of any rigid but light material, such as ribbed thin-walled steel, aluminum or magnesium alloy. A locating surface 44 (FIG. 3) at one end of the tool arm body 42 includes at least one and preferably three locating sockets 46. The locating sockets 46 are complementary in shape and number to the locating pins 28. Furthermore, the locating sockets 46 are positioned on the surface 44 of the tool arm 40 such that one socket 46 corresponds to and is aligned with one locating pin 28 on the docking station 26. Preferably, the shape of the tool arm main body 42 will have a tetrahedral profile, with a triangular basis matching the locating socket outer pattern.

Figure 5:
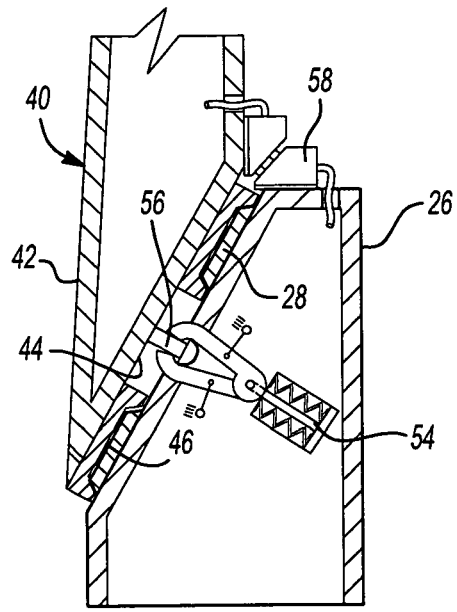
FIG. 5 is a view similar to FIG. 3, but illustrating the tool arm in a connected position with its associated docking station.

A robotic arm 50 (FIG. 4) of a robot 52 (FIG. 1) is associated with each tool arm 40. Furthermore, the robotic arm 50 is selectively secured to its associated tool arm 40 by a conventional robotic coupling 51 so that the robotic arm 50 moves its associated tool arm 40 between retracted a vehicle loading position and an assembly position. In the vehicle loading position, the robotic arm 50 moves its associated tool arm 40 laterally outwardly from the assembly station 16 to enable a new body preassembly to be moved into the assembly station. Conversely, in its assembly position, the robotic arm 50 selectively moves its associated tool arm 40 so that the reference blocks 60, e.g. locating pins, supported by the tool arm enter in contact with their matching surfaces onto the body shell, and then the locating sockets 46 engage the locating pins 28 as shown in FIG. 5. A conventional clamp assembly 54 mounted to the docking station 26 then engages a clamp pin 56 on the tool arm 40 to detachably lock the tool arm 40 to its associated docking station 26 at a predetermined and fixed position relative to the assembly station frame members 22. Thereafter, the robotic arm 50 disengages from its associated tool arm 40 by unlocking the robotic coupling 51 as shown in FIG. 6.

Referring now particularly to FIGS. 2 and 4, at least one, and more typically two or more, framing clamps 64 are secured to each tool arm 40. These framing clamps 64, once the robotic arm 50 has positioned the reference blocks 60 of its associated tool arm 40 onto the body shell, and its associated tool arm 40 on the docking station 26, engage across clamping surfaces 62 on the body components 20. Upon activation of the framing clamps 64, the framing clamps 64 secure the body components 18 against the reference block 60 at a predetermined position relative to the assembly station frame member 22 and thus relative to each other. When all of the framing clamps 64 engage their respective clamping surfaces on the body components 20, the body preassembly 18 is ready to be secured or welded together.

Figure 6:
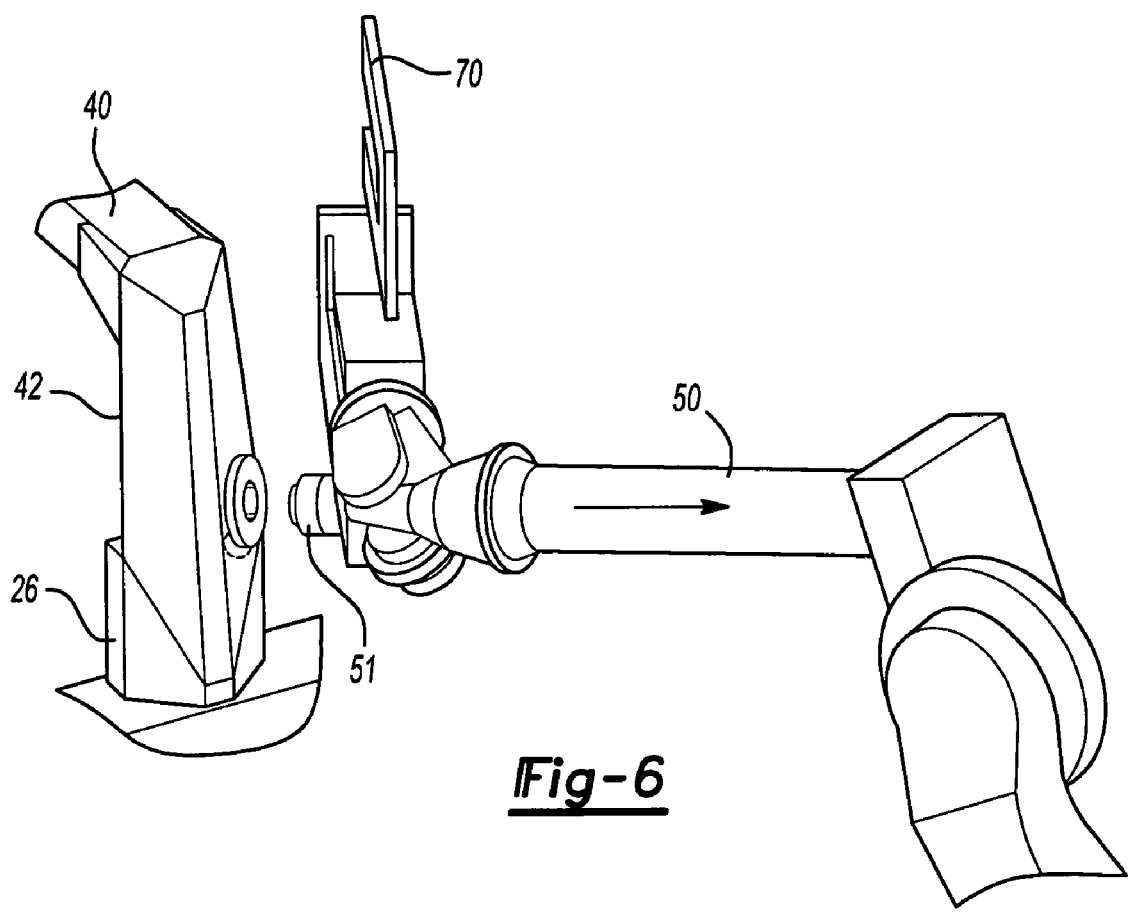
FIG. 6 is a view similar to FIG. 4, but illustrating the robotic arm disengaged from its associated tool arm.

As best shown in FIG. 6, after the robotic arm 50 has positioned its associated tool arm 40 at its associated docking station 26, and once the docking station lock 54 (FIG. 5) is engaged, the robotic arm 50 disengages from its associated tool arm body 42 by unlocking the robotic coupling 51. Thereafter, a welding gun 70 attached to the robotic arm 50 is then manipulated by the robotic arm 50 into the body preassembly 18. Upon activation of the welding gun 70, the welding gun 70 secures the body components 20 together thus completing the automotive body assembly.

It will be understood, of course, that although the body components 20 are typically secured together by welding, other types of attaching means may alternatively be used without deviation from either the scope or spirit of the present invention.

After the vehicle body components 12 have been welded or otherwise secured together by the robots 50 manipulating the welding guns 70 or other attachment means, each robotic arm 50 then reengages with its associated tool arm 40 by locking the tool arm 40 to the robotic arm 50 by the coupling 51 as shown in FIG. 4. In the meantime, all the framing clamps 64 are released. Thereafter, the tool arm clamp assembly 54 (FIG. 5) is actuated to its unlocked position thus enabling the tool arm 40 to disengage from its associated docking station 26. The framing clamps 64 are also opened, so that each robotic arm 50 is then able to move its associated tool arm 40 from the assembly position to a vehicle loading position at a position spaced laterally outwardly from the framing station 16. In the case of a new vehicle model to be framed, the robot will drop the previous tool arm 40 in its tool arm storage 27 (FIG. 1) and pick a new one suitable for the new model.

After the tool arms 40 are moved to their vehicle loading position, the now assembled automotive body is moved by the conveyor 12 out of the assembly station 16, a new vehicle carrier 14 with its body preassembly 18 is moved into the assembly station 16 and the above process is repeated.

Figure 7:
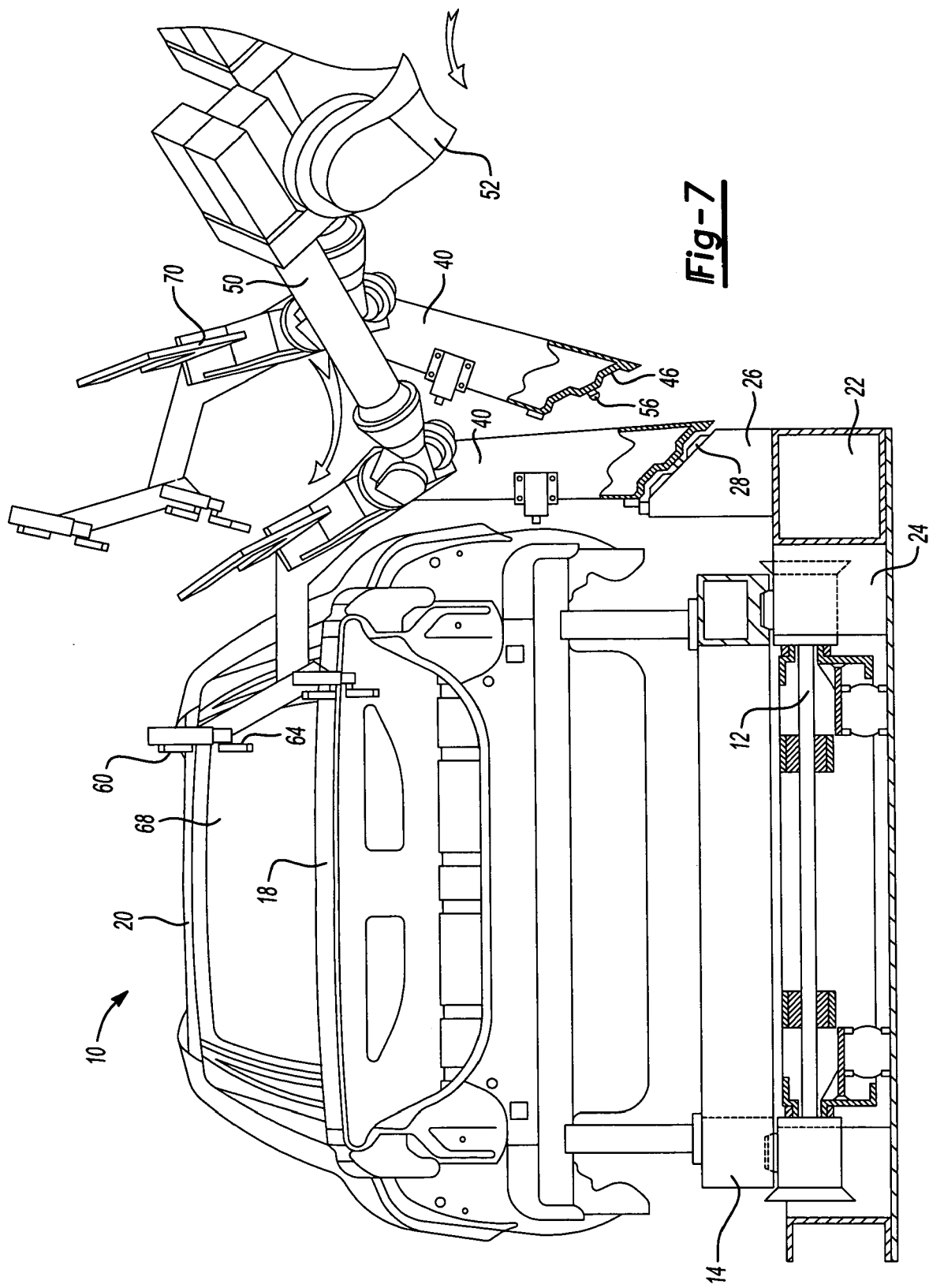
FIG. 7 is a diagrammatic end view illustrating the introduction of the tool arm in contact with the body to be framed, and its final positioning on the docking station.

With reference now to FIG. 7, an important advantage of the present invention is that each robotic arm 50 is able to manipulate portions of its associated tool arm 40 into the interior of the body preassembly 18 so that stationary reference blocks 60 are positioned closely adjacent the reference surfaces on the body components 20. For example, as shown in FIG. 7, the robotic arm 50 may be used to manipulate its associated tool arm 40 to move sections of the tool arm 40 through relatively small openings 68 of the body preassembly 18 prior to attaching the tool arm 40 to its docking station 26 as shown in solid line. This, in turn, permits inexpensive and accurate stationary reference block 60 and rapid acting clamps 64 to be used to secure the body components 20 together at their desired position prior to assembly.

A still further advantage of the present invention is that different vehicle body styles may be assembled at the same assembly station 16 and using the same robots 52. More specifically, since the robotic arms 50 of the robots 52 selectively engage and disengage from their associated tool arms 40, the robotic arms 50 may also selectively engage different tool arms 40 in order to accommodate different automotive body styles. As such, by merely selectively engaging and disengaging with different tool arms 40, different body styles may be easily accommodated and assembled at the same assembly station 16. Because of the modularity of the tool set used, if the design of two different bodies presents some commonality, such as a front block, only a fraction of the tool set can be changed to frame this different body.

With reference now to FIGS. 8-11, a preferred robotic coupling 151 is illustrated for selectively coupling the tool arm 40 (FIG. 11) to the robotic arm 50. The robotic coupling 151 includes a plate 152 having two ends 154 and 156 and two spaced-apart sides 158 and 160. The plate 152 is secured to the tool arm 40 in any conventional fashion, such as by bolts or other threaded fasteners.

Figure 8:
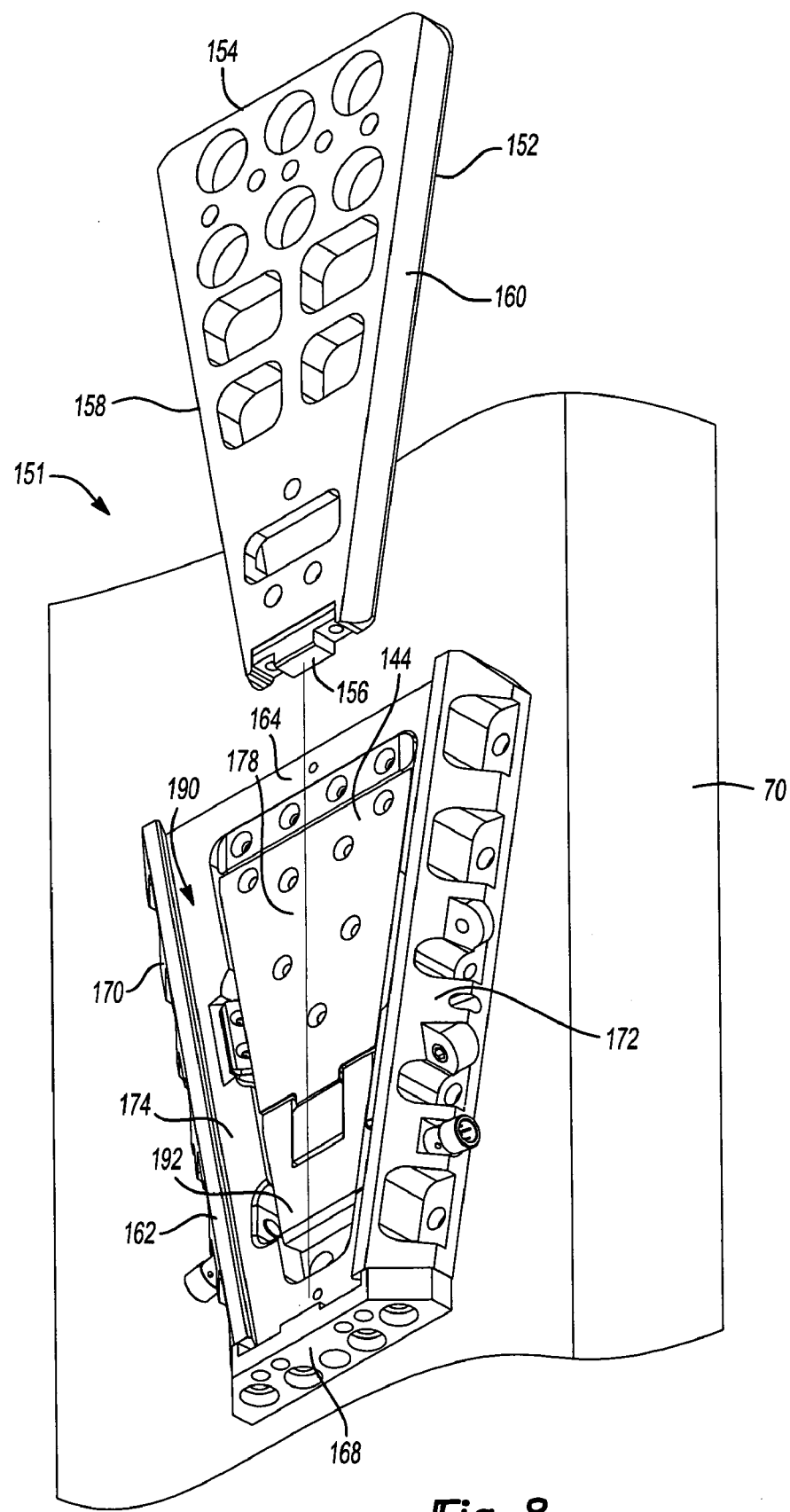
FIG. 8 is an exploded view illustrating a preferred coupling between the robotic arm and the tool arm.
Figure 11:
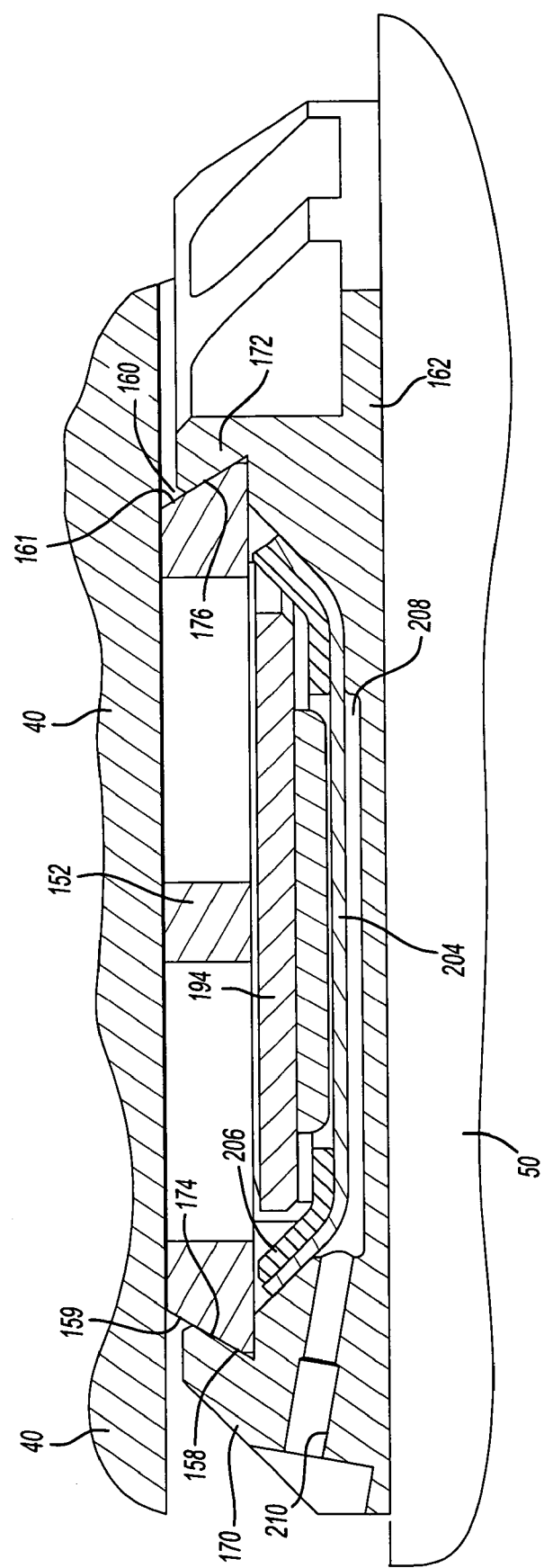
FIG. 11 is a sectional view taken along line 11-11 in FIG. 10, illustrating fluid chamber coupling.

With reference now particularly to FIGS. 8 and 11, the sides 158 and 160 of the plate 152 taper away from each other from the bottom end 156 and to the top end 154 of the plate 152. Furthermore, as best shown in FIG. 11, an upper surface 159 and 161 of the sides 158 and 160, respectively, taper toward each other.

Still referring to FIGS. 8 and 11, the robotic coupling 51 further includes a coupler 162 which is secured to the robotic arm 50, either directly or through a tool attached to this robotic arm, in any conventional fashion, such as by bolts. The coupler 162 includes a top 164, bottom 168 and sides 170 and 172 which, together, define a cavity 174 which is complementary in shape to the plate 154. Consequently, the sides 170 and 172 of the coupler 162 taper outwardly from the bottom 168 and to its top 164. Additionally, the upper surfaces of the sides 170 and 172 are tapered inwardly as shown at 174 and 176, respectively, as best shown in FIG. 11.

Figure 9:
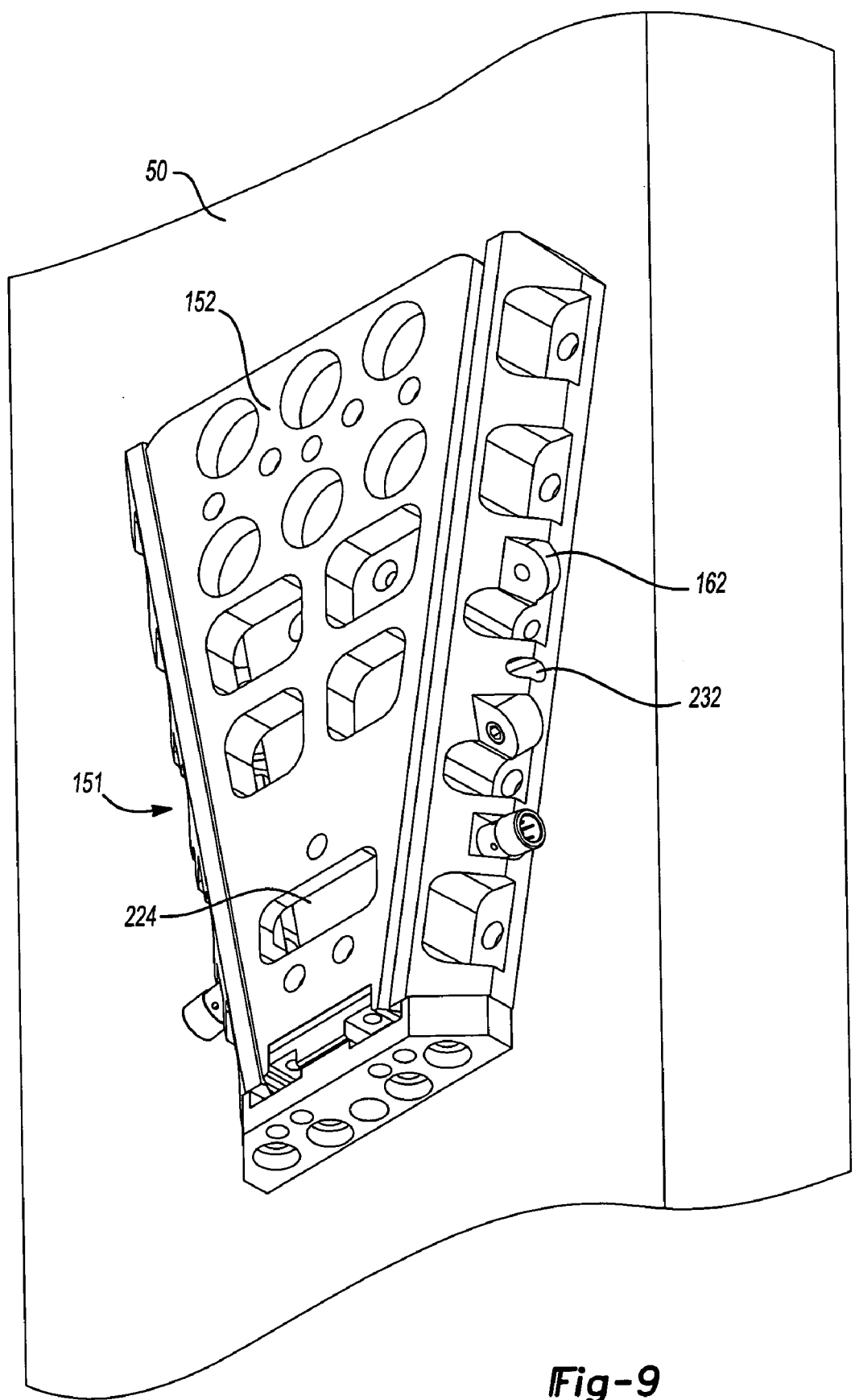
FIG. 9 is a perspective view illustrating the coupling assembly, the tool arm being removed for better clarity.

With reference now particularly to FIGS. 8 and 9, the top 164 of the coupler 162 is open so that the plate 152 may be flatly positioned against a bottom 178 of the coupler 162 with the ends 168 and 156 of the coupler 162 and plate 152 spaced apart from each other. In this position, the plate 152 and coupler 162 are in a disengaged position in which the coupler 162 with its attached robotic arm 50 may be moved independently of the plate 152 with its attached tool arm 140.

Conversely, as the ends 168 and 156 of the coupler 162 and plate 152 are moved together as shown in FIGS. 9 and 11, the plate 152 nests within the cavity 174. In this engaged position the sides 158 and 160 of the plate 152 dovetail with the sides 170 and 172 of the coupler 162 to lock the plate 152 and coupler 162 together against relative movement. With the plate 152 and coupler 162 in the position illustrated in FIG. 9, the robotic arm 50 may be used to manipulate the tool arm 40 in the desired fashion.

Figure 17:
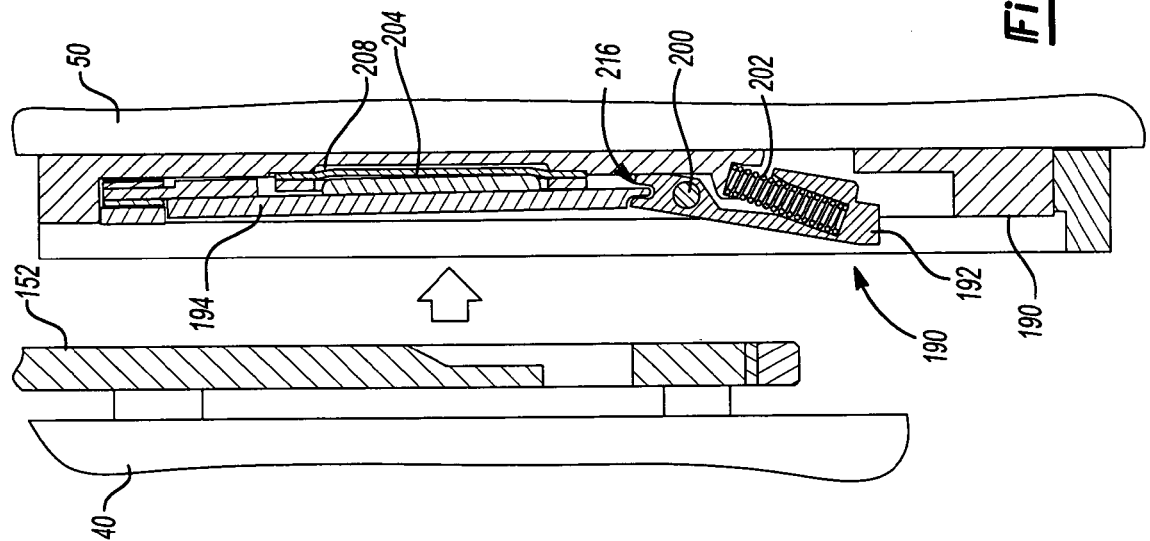
Figure 16:
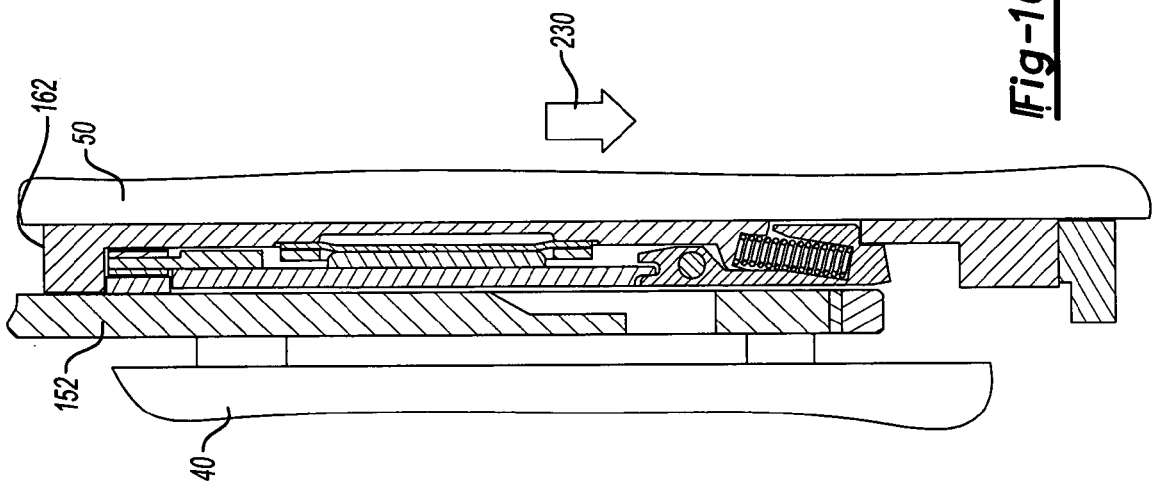

With reference now particularly to FIGS. 8, 16 and 17, a latch assembly 190 is contained within the coupler 162 for selectively locking the coupler 162 and plate 152 together when the plate 152 and coupler 162 are in their engaged position (FIG. 9). This latch assembly 190 includes a latch bar 192 which is pivotally mounted by a pin 200 to the coupler 162. An actuator plate 194 is mounted to the coupler 162 and has an end 216 pivotally connected to the latch bar 192 so that the latch bar 192 pivots about the pin 200 in unison with movement of the actuator plate 194. The actuator plate 194 is movable between an extended position, illustrated in FIG. 17, and a retracted position illustrated in FIG. 16. In its extended position, the latch bar 192 protrudes outwardly from the bottom 178 of the coupler 162 and conversely, in its retracted position (FIG. 14), the latch bar 192 is generally flush with the bottom 190 of the coupler 162.

Figure 10:
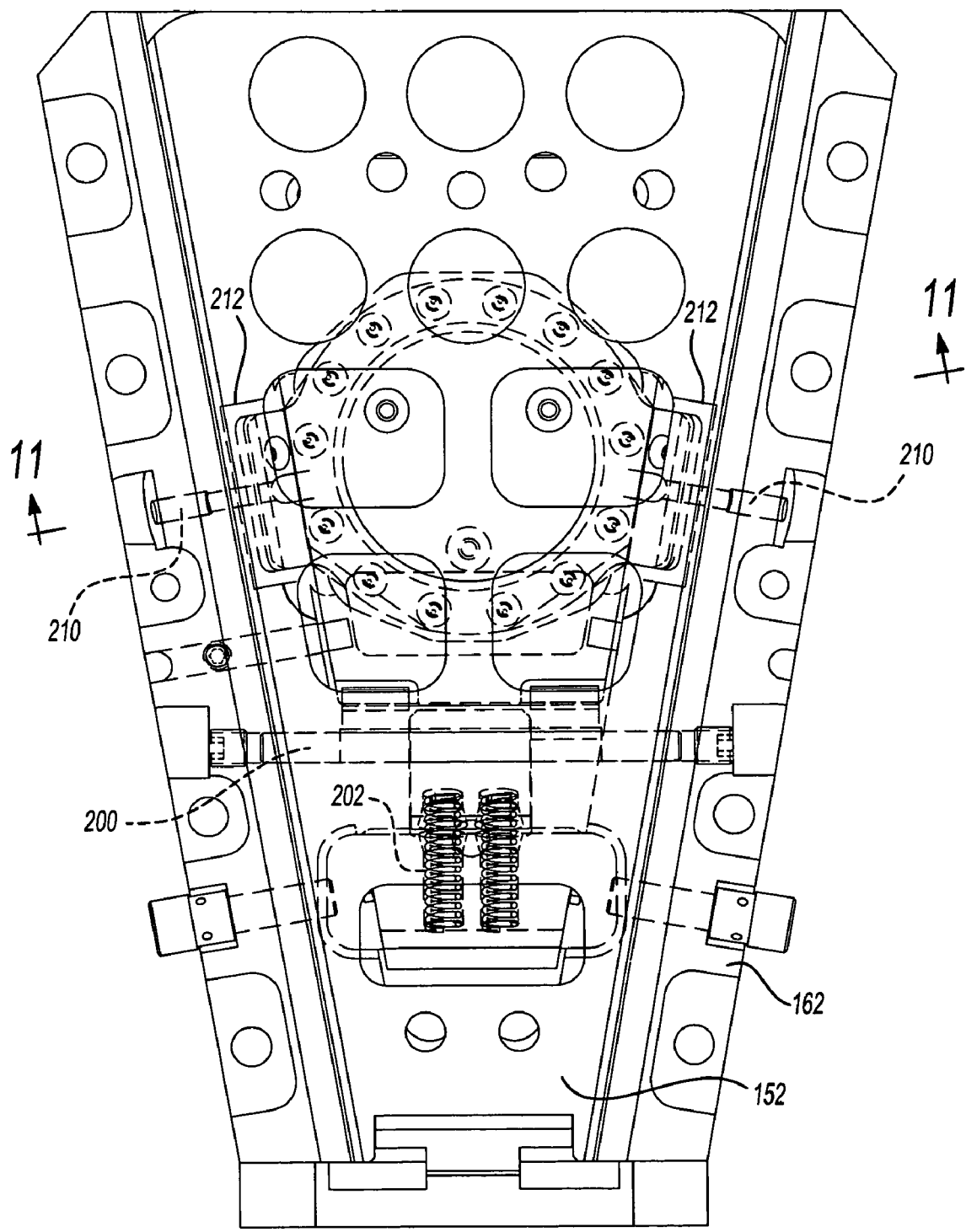
FIG. 10 is a plan view illustrating a fluid coupling and latch status detection.

As best shown in FIGS. 10 and 12, a pair of compression springs 202 are entrapped in a state of compression between the coupler 162 and the latch bar 192. The springs 202 urge the latch bar 192 towards its extended position illustrated in FIG. 12.

With reference now to FIGS. 10-12, a resilient diaphragm 204 is attached to the coupler 162 by an annular seal ring 206 thus forming a fluid chamber 208 between the diaphragm 204 and the coupler 162. This fluid chamber 208, in turn, is fluidly accessible through a fluid port 210 (FIG. 11).

As best shown in FIGS. 10 and 11, the diaphragm 204, together with its seal ring 206, preferably includes substantially diametrically opposed, upwardly extending wings 212. These wings facilitate access to the chamber 208 by the fluid port 210 while still retaining a very thin profile for the coupler 162.

With reference now to FIG. 12, when the fluid chamber 208 is in its uninflated position, the springs 202 maintain the latch bar 192 in its extended position. Conversely, when the fluid chamber 208 is inflated, typically by pneumatic pressure as shown in FIG. 16, the diaphragm 204 moves the actuator plate 194 outwardly relative to the diaphragm 204 thus pivoting the latch bar 192 from its extended to its retracted position against the force of the springs 202.

With reference now to FIGS. 12-17, the operation of the robotic coupling 151 will now be described. With reference first to FIG. 12 and assuming that the coupler 162 and plate 152 are disengaged from each other, the robotic arm 50 moves the coupler 162 in the direction of arrow 220 toward the plate 152. At this time, the end 156 of the plate 152 is spaced upwardly from the end 168 of the coupler 162 so that the plate 152 may be flatly positioned against the bottom 174 of the coupler 162 as shown in FIG. 13. Furthermore, as the coupler 162 is moved from the position shown in FIG. 12 and to the position shown in FIG. 13, the plate 152 engages the outwardly protruding latch bar 192 and pivots the latch bar 192 from its extended position shown in FIG. 12 and to its retracted position shown in FIG. 13.

With reference now to FIGS. 13 and 14, after the robotic arm 50 has positioned the coupler into flat engagement with the plate 152 as shown in FIG. 13, the robotic arm 50 moves the coupler 162 in the direction of arrow 222, i.e. in an end-to-end direction relative to both the coupler 162 and plate 152, to the engaged position illustrated in FIG. 14. At this time, the sides of the coupler 162 and plate 152 abut, or nearly abut, together thus locking the plate 152 and coupler 162 together. Simultaneously, the latch bar 192 registers with an opening 224 in the plate 152 and the force of the springs 202 return the latch bar 192 to its extended position (FIG. 14). In doing so, the latch bar 192 is positioned within the opening 224 thus locking the plate 152 and coupler 162 together against end-to-end movement while the dovetail nesting of the sides of the coupler 162 and plate 152 locks the coupler 162 and plate 152 together against movement in the other axis. Once the tool arm is released from its docking station, the robot 50 may then be used to manipulate the tool arm 40 to the position desired.

Figure 15:
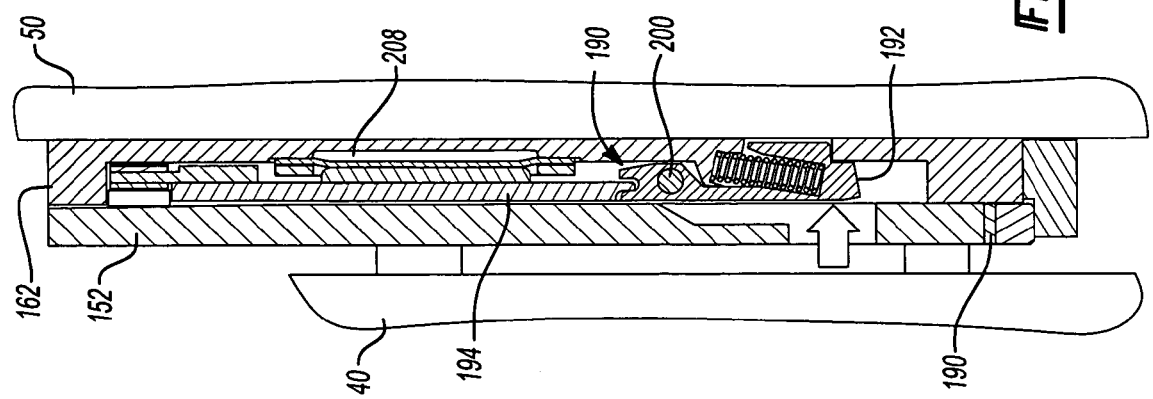

With reference now to FIGS. 15 and 16, once the tool arm 40 is positioned at the desired position, the chamber 208 is pressurized thus moving the actuator plate 194 to an extended position and pivoting the latch bar 192 to its retracted position as shown in FIG. 15. With the latch bar 192 in its retracted position, the robotic arm 50 then moves the coupler 162 in a downwardly end-to-end movement in the direction indicated by arrow 230 thus disengaging the plate 152 from the coupler 162. The robotic arm 50 then moves the coupler 162 to a completely disengaged position from the plate 152 as shown in FIG. 17. Additionally, the chamber 208 is depressurized in FIG. 17 thus returning the latch bar 192 to its extended position under the force of the springs 202.

With reference now to FIG. 9, in order to enable the emergency release of the plate 152 from the coupler 162, e.g. in the event of failure of the diaphragm, an opening 232 is provided through the coupler 162. This opening is aligned with an area below the actuator plate 194 adjacent the latch bar 192. Consequently, insertion of a tool, such as a screwdriver, enables the latch bar 192 to be mechanically pivoted by the tool to its retracted position thus releasing the plate 152 from the coupler 162.

The robotic coupling illustrated in FIGS. 8-17 enjoys many advantages over the previously known robotic couplings. Perhaps most importantly, the robotic coupling 151 is not only lightweight, but also enjoys a very thin profile since both the coupler 162 as well as the plate 152 may be thin in thickness, e.g. approximately one inch. Furthermore, the present invention provides a secure attachment between the plate 152 and the coupler 162 due to the dovetail connection between the plate 152 and coupler 162. In addition, only limited movement of the robotic arm 50 is required in order to move the plate 152 and coupler 162 between their engaged and disengaged positions.

Figure 18:
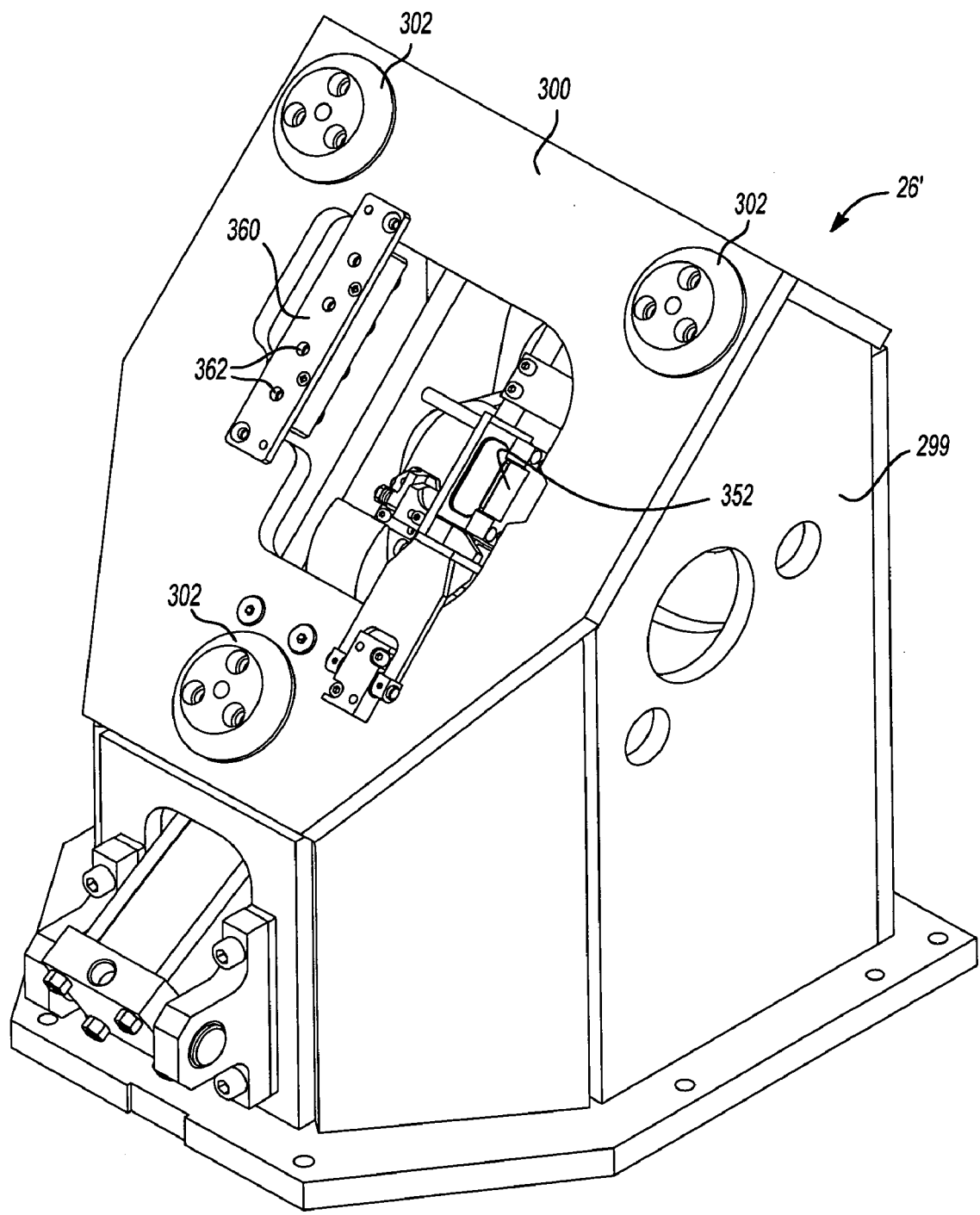
FIG. 18 is an elevational view illustrating a preferred docking station.
Figure 32:
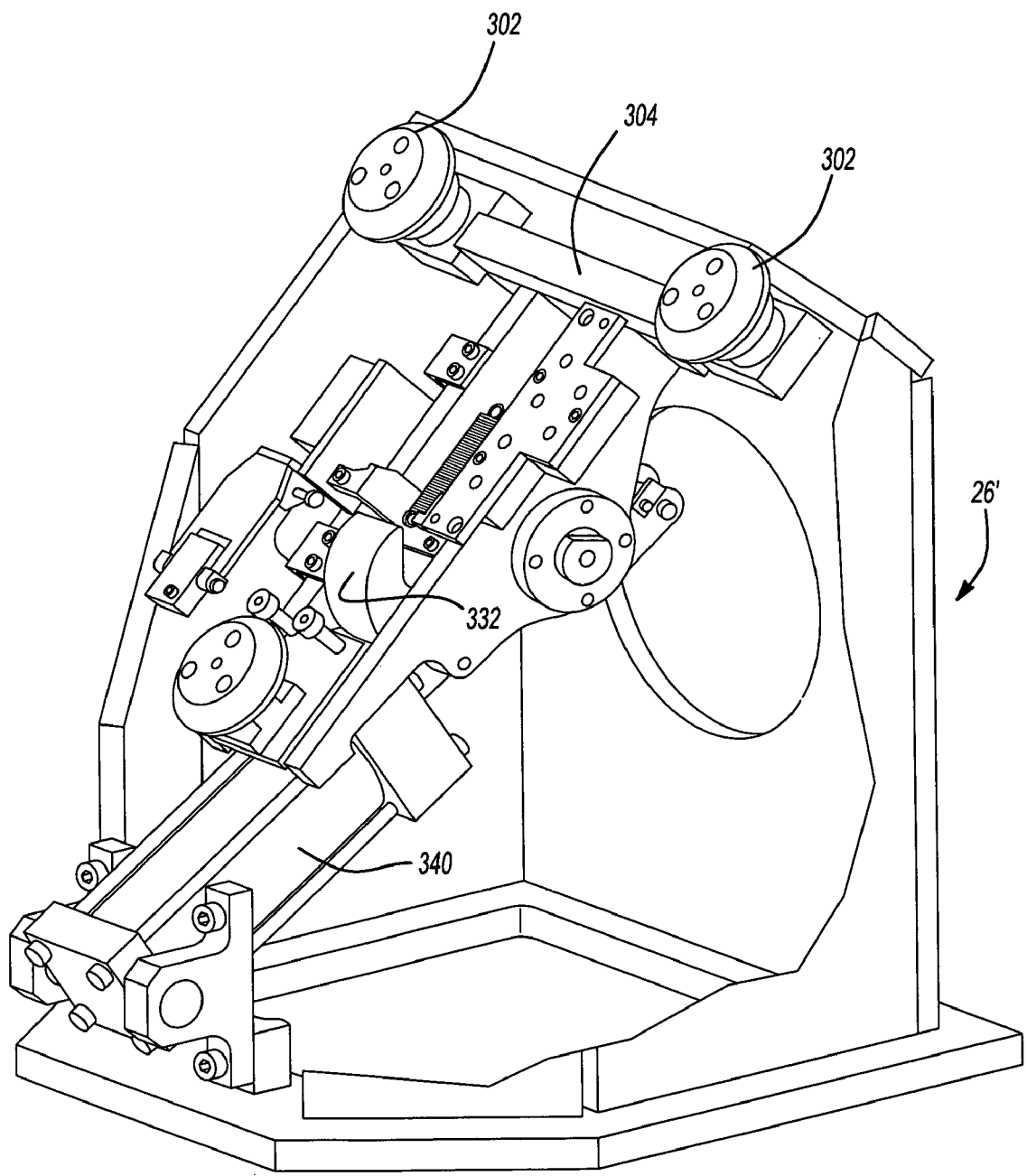
FIG. 32 is an isometric side view of the docking station with parts removed for clarity.

With reference now to FIGS. 18 and 32, a still further preferred embodiment of a docking station 26' in which, as before, the docking station 26' includes a housing 299 having docking surface 300 having three frusto-conical locator pins 302 positioned on the surface 300 in a triangular pattern. A T-shaped brace 304 is contained within the docking station 26' so that each end of the T-shaped brace 304 is aligned with a center of one of the locator pins 302. As such, all compressive force exerted against the locator pins 302 is transmitted solely to the T-shaped brace 304 rather than the housing for the docking station 26'.

Figure 23:
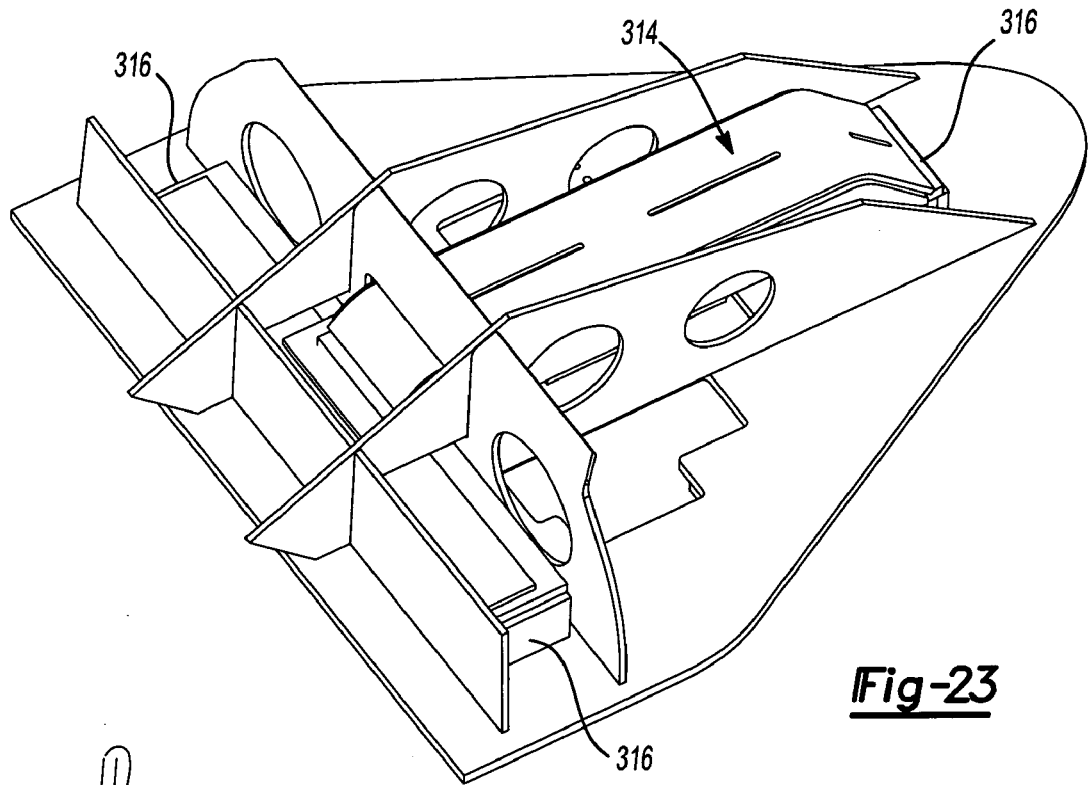
FIGS. 23-24 are elevational views illustrating a T-shaped brace in the tool arm.

As best shown in FIG. 23, the tool arm 40 includes three locator sockets 306 mounted on a docking surface 308. These locator sockets 306 are complementary in shape to the locator pins 302 on the docking station 26' (FIG. 18). Additionally, the sockets 306 are mounted on the docking surface 308 such that one locator socket 306 s aligned with one locator pin 302 when the tool arm 40 is docked on the docking station 26'.

Figure 21:
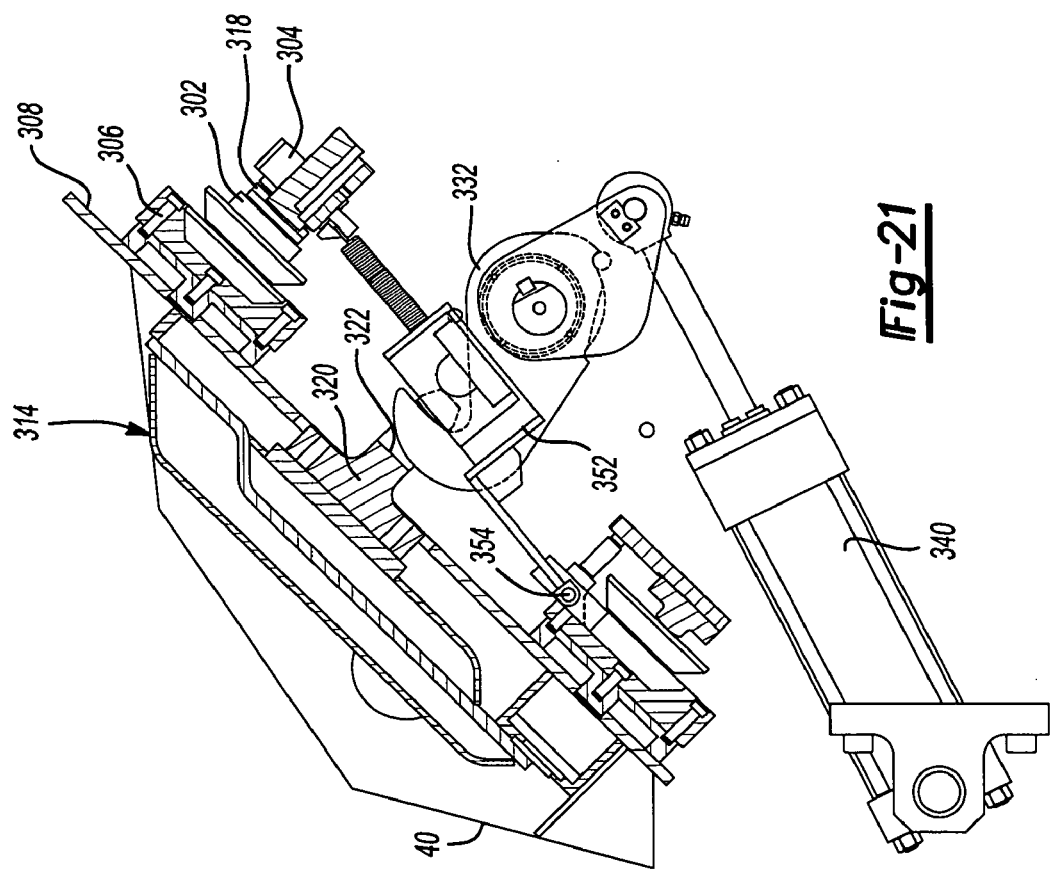
Figure 24:
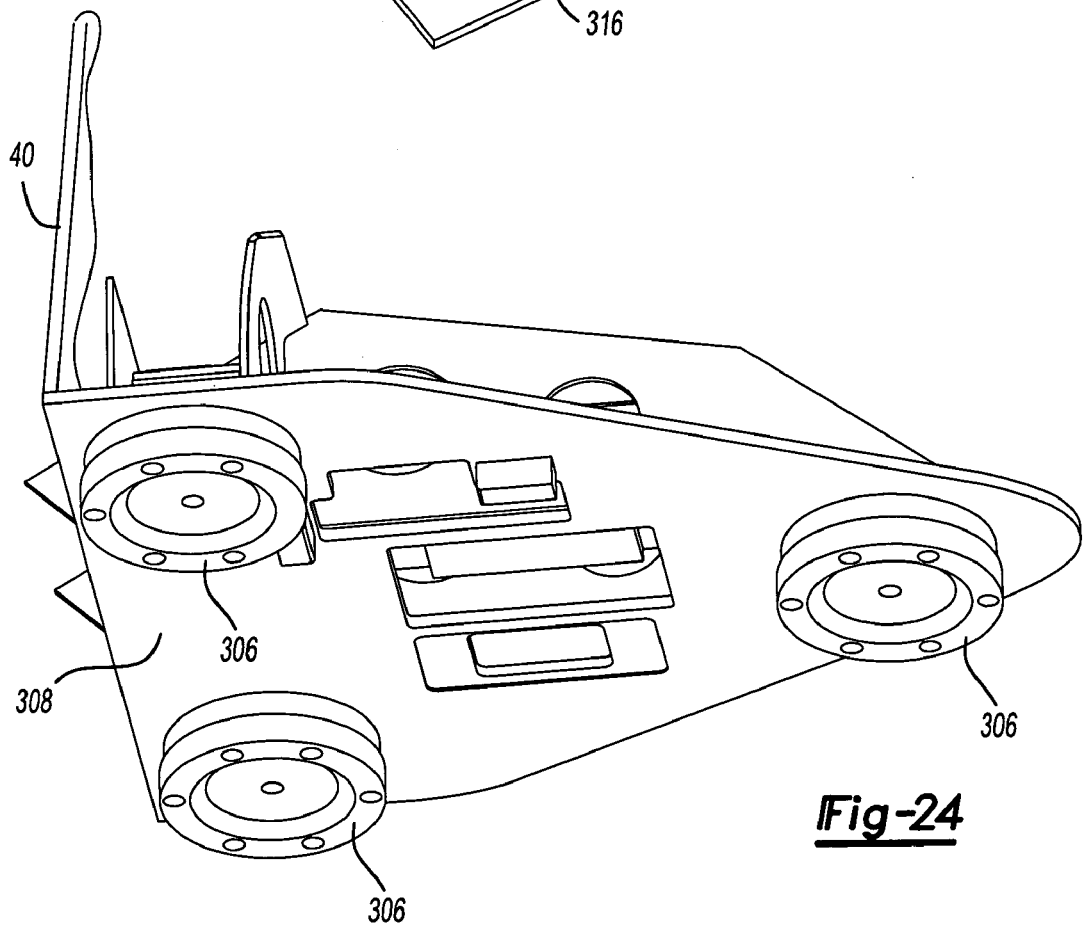

As best shown in FIGS. 21, 23 and 24, a T-shaped brace 314 is contained within the tool arm 40 so that each end 316 (FIG. 23) is aligned with and connected to a center of each locator socket 306. Preferably, a Belleville washer 318 is disposed between at least one end 316 of the T-shaped brace 304 and its associated locator pin 302.

As best shown in FIG. 21, a retainer 320 having a retainer opening 322 is secured to the T-shaped brace 314. Consequently, all axial forces exerted on the retainer 320 are transmitted directly through the locator sockets 306 and locator pins 302 and their associated T-shaped braces 314 and 304, respectively.

With reference now to FIG. 19, an actuator assembly 330 is contained within the docking station 299 for selectively locking the tool holder 40 and docking station 26' together. The actuator assembly includes a hook 332 which is pivotally mounted to an eccentric shaft 334 which in turn is pivotally mounted to the T-shaped brace 304.

A pair of cam plates 336 are positioned along opposite sides of the hook 332. The cam plates 336 are secured to the shaft 334 by a key 337 so that the cam plates 336 pivot in unison with the eccentric shaft 334.

Figure 22:
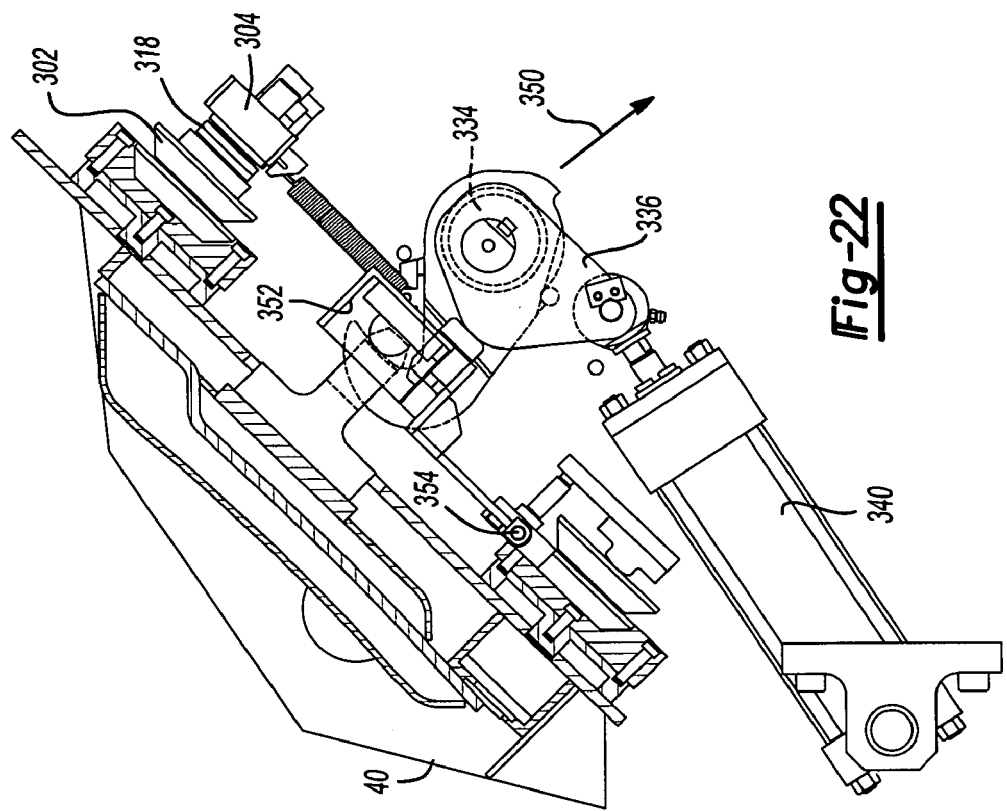

A linear actuator 340 pivots both the cam plates 336 and hook 332 between an unlocked position, illustrated in FIG. 19, and the locked position, illustrated in FIG. 22 in a fashion to be shortly described. In its unlocked position (FIG. 19), the linear actuator 340 is in its extended position. In this position, a dowel 342 extending between the cam plates 336 engages a stop 344 on the hook 332. The dowel pin 342 maintains the hook 332 in its unlocked position against the force of one or more tension springs 348.

With reference now to FIG. 20, with the linear actuator 340 in its fully extended position and the hook 332 in its fully retracted position, the robot is used to manipulate and position the tool arm 40 on top of the docking station 26' such that the three locator sockets 306 on the tool arm 40 engage with the three locator pins 302 on the docking station 26'. It will be understood, of course, that the location of the locator sockets and locator pins may be reversed, i.e. the locator sockets are positioned on the docking station 26' while the locator pins are positioned on the tool arm 40. Indeed, it is possible for a mixture of locator sockets and locator pins to be provided on both the docking station 26' and tool arm 40 as long as one locator socket engages each of the locator pins.

With reference now to FIG. 21, after the tool arm 40 is positioned in its docking position on the docking station 26', the actuator 340 is partially retracted to the position shown in FIG. 21. In doing so, the tension springs 348 pivot the hook 332 to the position shown in FIG. 21 in which the hook extends through the opening 322 in the retainer 320 thus locking the tool arm 40 to the docking station 26'.

Thereafter, the linear actuator 340 is further retracted to the final position illustrated in FIG. 22 and, in doing so, moves the hook 332 in a direction normal to the tool arm 40 as indicated by arrow 350 due to the eccentricity of the shaft 334. This normal movement of the hook 332 thus compresses the tool arm 40 and docking station 26' together through the locator pins 302 and sockets 306.

As previously described, the retainer 320 is mounted directly to the T-shaped brace 314 while, similarly, the eccentric shaft 334 is rotatably mounted to the T-shaped brace 304 contained within the docking station 26'. Consequently, the entire tensile force exerted between the hook 332 and the retainer 320 when the actuator 340 is moved to its final retracted position shown in FIG. 22 is transmitted solely through the T-shaped members 314 and 304. Since the ends of the T-shaped braces 314 and 304 are connected to the center of the locator sockets and locator pins, both the docking station 26' as well as the tool holder 40 are isolated from any deflection or distortion caused by the tensile force between the hook 332 and retainer 320 and the corresponding offsetting compressive force between the locator pins and sockets. Instead, any deflection or distortion caused by the compressive force between the hook 332 and retainer 320 is borne entirely by the T-shaped braces 314 and 304.

Figure 25:
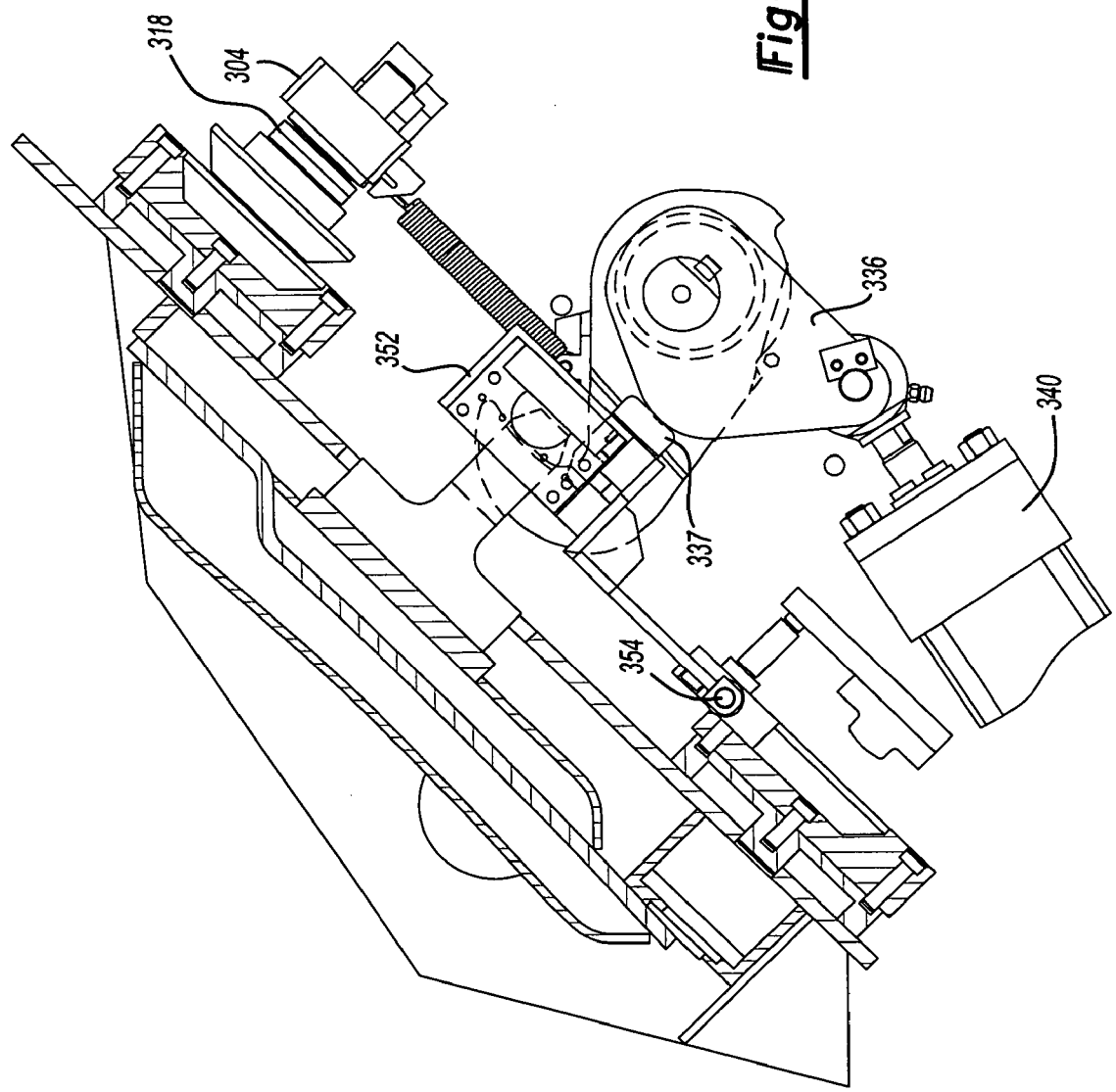
FIG. 25 is an elevational view of the tool arm with parts removed for clarity.

With reference now to FIG. 25, when the linear actuator 340 is moved to its most retracted position, the cam plate 336 engages a cam follower 337 on an electrical connection box 352 and pivots the box 352 from a retracted position, illustrated in FIG. 21, to an extended position, illustrated in FIG. 25 about a pivot axis 354. The electrical box 352 contains one or more spring loaded electrical contacts and is conventional in construction. The box 336, when in its extended position (FIG. 22), provides one or more electrical connections between the docking stations 26' and the tool holder 40.

As can be seen from the foregoing, the attachment between the docking station 26' and the tool support 40 not only eliminates distortion of both the tool support 40 and docking station 26' by transferring any such distortion to the T-shaped braces 314 and 304, but is also simple and fail proof in construction.

In many situations, it is also necessary to provide fluid power from the docking station 26' to the tool support 40. Consequently, as best shown in FIGS. 18 and 25, a fluid port plate 360 is mounted on the docking surface 300 of the docking station 26'. This port plate 360 includes one or more fluid ports 362.

Figure 26:
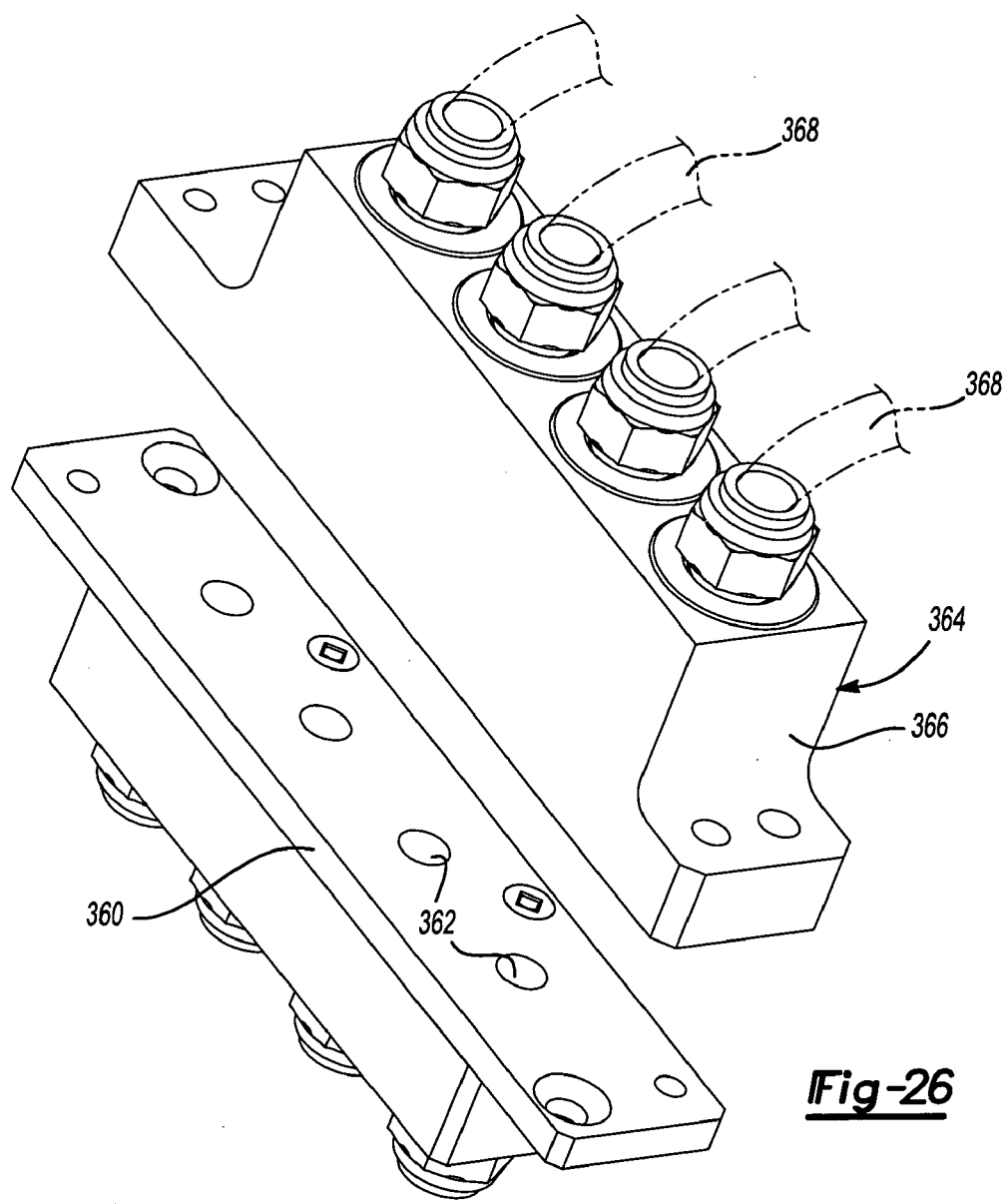
FIG. 26 is an exploded view illustrating a fluid connector between the tool arm and the docking station.

With reference now particularly to FIG. 26, a fluid coupling assembly 364 is also connected to the tool holder 40. The fluid coupling assembly 364 includes a housing 366 having one or more fluid lines 368 extending outwardly from the housing.

Figure 31:
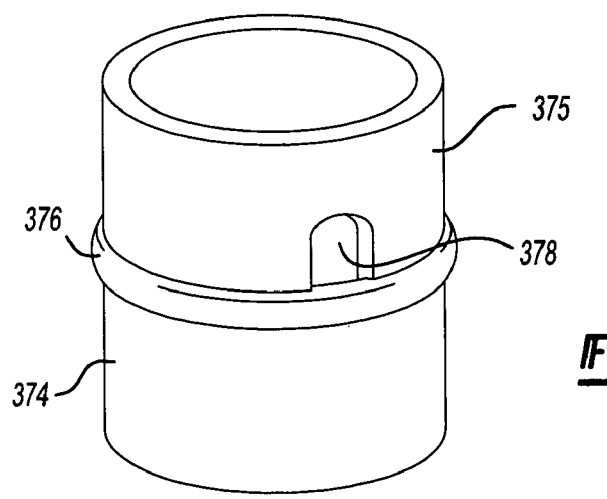
FIG. 31 is an elevational view of the piston bearing portion of the fluid coupling.
Figure 27:
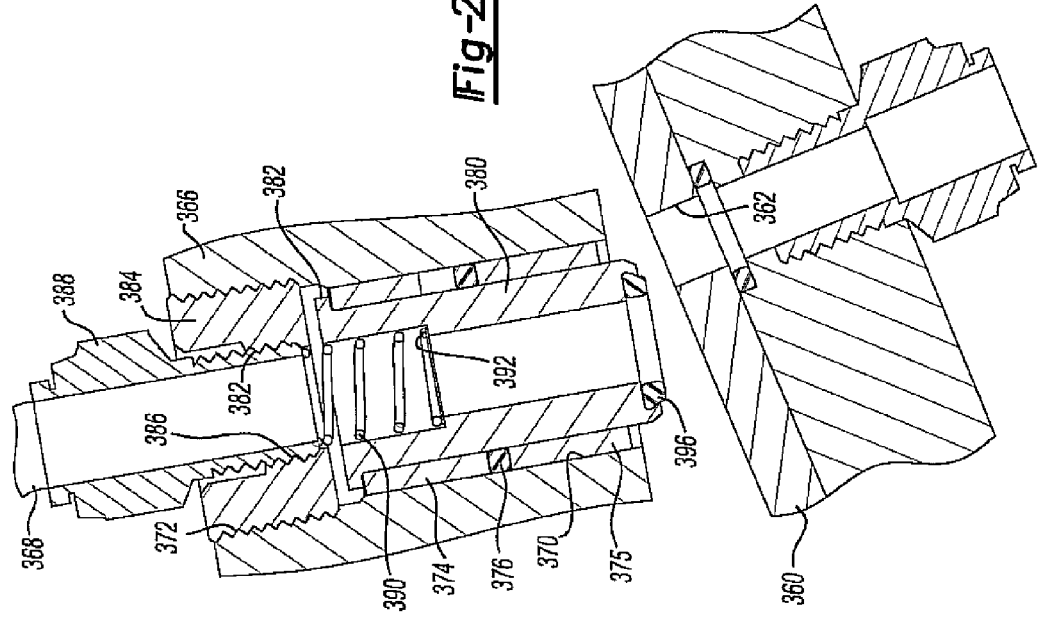

With reference now to FIG. 27, one fluid line 368 is there shown in greater detail and includes a bore 370 formed through the housing 366 and threaded at its upper end 372. A pair of aligned bushings 374 and 375, better shown in FIG. 31, are disposed within the bore 370 and an O-ring 376 is positioned between the bushings 374 and 375. One bushing 375, preferably the inner one submitted to air chamber pressure, also includes a notch 378 to facilitate removal and replacement of the O-ring 376 when required.

With reference again to FIG. 27, a tubular piston 380 is axially slidably mounted within the bushings 374 and 375 and includes an outwardly extending lip 382 at its upper end. This lip 382 abuts against the top of the bushing 374 and retains the piston 380 within the bushings 374 and 375 while the O-ring 376 fluidly seals the piston 380 to the bushings 374 and 375 and housing 366.

A tubular plug 384 threadably engages the threaded end 372 of the housing bore 370 and, in turn, includes an internally threaded bore 386 aligned with the piston 380. A conventional fluid coupling 388 is then threadably connected to the threaded plug bore 384.

A lightweight compression spring 390 is compressed between the plug 384 and an annular abutment surface 392 on the piston 380. Additionally, an O-ring 396 is attached to and protrudes outwardly from the free end of the piston 380.

Figure 28:
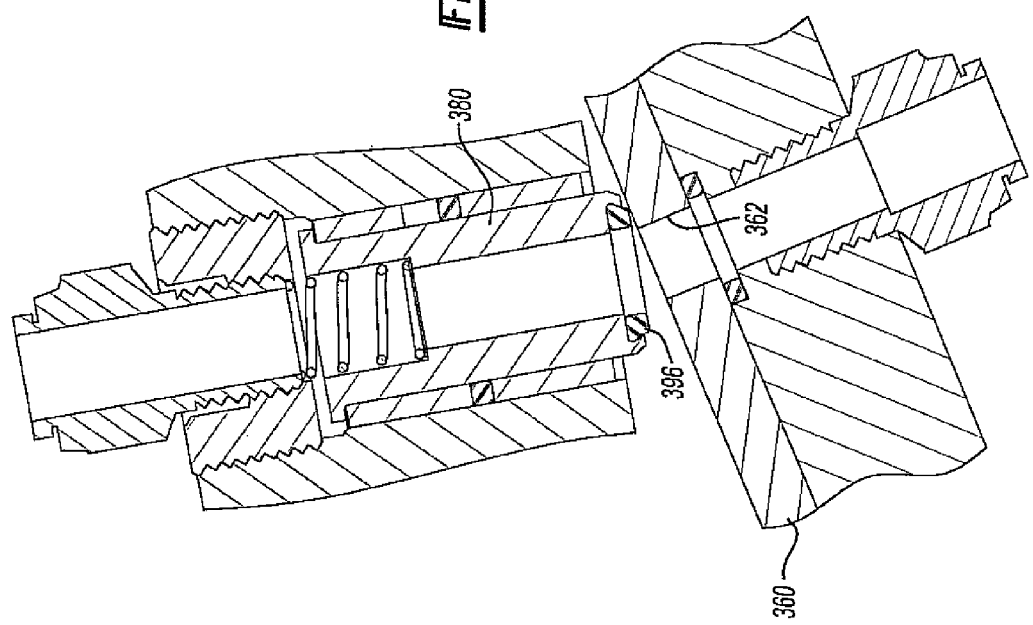

With reference then to FIGS. 27 and 28, as the robotic arm 50 moves the tool holder 40 into its docking position from the position shown in FIG. 27 to the position shown in FIG. 28 and finally to the position shown in FIG. 29, the O-ring 396 engages the plate 360 around the fluid port 362 compressing the piston 380 against the force of the compression spring 390 as required. When the tool arm 40 reaches its final docking position (FIG. 29), the piston 380 is aligned with the port 362. In this position, the compression spring 390 maintains contact of the O-ring 396 with the port plate 360.

Thereafter, as shown in FIG. 30, upon pressurization of the port 362, the fluid pressure causes the piston 380 to shift axially in the direction of arrow 398 toward the port plate 360. The amount of axial displacement of the piston 380 from the position shown in FIG. 28 prior to pressurization and to the position shown in FIG. 29 after pressurization is exaggerated in the drawing for added clarity. In any event, the axial displacement of the piston 380 in the direction of arrow 398 compresses the O-ring 396 thus establishing the fluid seal between the piston 380 and the fluid port 362.

A primary advantage of the fluid coupling illustrated in FIGS. 26-29 is that the direction of approach between the tool support 40 and docking station 26 may be at an angle of up to 90 degrees off center and requires only minimal axial displacement between the tool arm and the docking station 26' once the pistons 380 and fluid port 362 are aligned. This, in turn, allows greater flexibility in the design of the tooling attached to the tool arm that is required for the previously known fluid couplings which require extended axial movement between the tool arm and the docking station in order to achieve the necessary fluid connection.

Having described my invention, many modifications thereto will become apparent to those skilled in the art to which it pertains without deviation from the spirit of the invention as defined by the scope of the appended claims.

We claim:

1. A docking apparatus comprising:
   a docking station having a docking surface,
   a tool arm having a docking surface,
   at least three locator pins mounted on one or both of said docking surfaces,
   at least three locator sockets complementary in shape to said locator pins mounted on one or both of said docking surfaces, said locator pins and said locator sockets being positioned so that, when said tool arm is moved to a docking position relative to said docking station, each locator pin on each docking surface registers with a locator socket on the other docking surface,
   an actuator assembly mounted to said docking station and movable between an unlocked position in which said docking station and said tool arm are separable from each other and a locked position in which said docking station and said tool arm are secured against movement relative to each other, wherein said actuator assembly comprises a retainer attached to said tool arm and protruding outwardly from said tool arm docking surface, and a hook mounted to said docking station and movable between a locked position in which said hook disengages from said retainer and a locked position in which said hook engages said retainer.

2. The invention as defined in claim 1 wherein said locator pin and socket have preferably a 90-degree angle frusto-conical shape.

3. The invention as defined in claim 1 wherein said locator pins and locator sockets are arranged in a triangle on said docking surfaces and wherein said retainer and said hook are positioned in the center of said triangle on their respective docking surface.

4. The invention as defined in claim 3 and comprising a first T-shaped brace positioned within said tool arm and having its ends aligned with and secured to a center of each locator pin or locator socket on said tool arm docking surface, said retainer being secured to said T-shaped brace.

5. The invention as defined in claim 4 and comprising at least one compressive member sandwiched between one end of said brace, and its associated locator pin or socket supporting structure.

6. The invention as defined in claim 4 and comprising a second T-shaped brace positioned within said docking station and having its ends aligned with and secured to a center of each locator pin or locator socket on said base docking surface, said hook being secured to said T-shaped brace.

7. The invention as defined in claim 1 and comprising an eccentric shaft, said hook being pivotally mounted to said eccentric shaft, a cam attached to said shaft, and a linear actuator attached to said cam so that said liner actuator pivots said cam and shaft as said linear actuator moves from a first to a second position, wherein said hook engages said retainer at a midpoint of the linear actuator movement from said first to said second position so that further movement of said linear actuator to said second position retracts said hook away from said retainer and imposes a tensile force on said hook and said retainer.

8. The invention as defined in claim 7 and comprising a spring which urges said hook toward said locked position, a dowel attached to said cam, and said hook having a stop surface which abuts against said dowel so that said cam retains said hook in said unlocked position against the force of said spring when said linear actuator is in said first position.

9. The invention as defined in claim 7 and comprising an array of electrical connectors pivotally connected to said base, wherein said cam pivots said electrical connector array outwardly from said docking station docking surface when said linear actuator moves to said second position.

10. The invention as defined in claim 9 wherein said cam comprises a pair of cam plates, said hook being sandwiched between said cam plates.

11. A docking apparatus comprising:
a docking station having a docking surface,
a tool arm having a docking surface,
at least three locator pins mounted on one or both of said docking surfaces,
at least three locator sockets complementary in shape to said locator pins mounted on one or both of said docking surfaces, said locator pins and said locator sockets being positioned so that, when said tool arm is moved to a docking position relative to said docking station, each locator pin on each docking surface registers with a locator socket on the other docking surface,
an actuator assembly mounted to said docking station and movable between an unlocked position in which said docking station and said tool arm are separable from each other and a locked position in which said docking station and said tool arm are secured against movement relative to each other,
a plate having a fluid port on said docking station, a fluid connector mounted on said tool arm which is aligned with said fluid port when said docking station and said tool arm are in said docking position.

12. The invention as defined in claim 11 wherein said fluid connector comprises a bore, a tubular piston mounted in said bore and movable between a retracted and extended position in which a free end of said piston protrudes outwardly from said tool support docking surface, a spring which urges said piston toward said extended position, and a seal mounted to said free end of said piston and adapted to engage said plate.

13. The invention as defined in claim 12 and comprising a seal disposed between an outer surface of said piston and said bore so that, upon pressurization of said fluid port, said fluid pressure generates an outward force on said piston to thereby compress said first seal against said plate.

* * * * *